United States Patent

[11] 3,613,079

[72] Inventors Rolf Jurk;
Wolfgang Killinger, both of Munich, Germany
[21] Appl. No. 557,462
[22] Filed June 14, 1966
[45] Patented Oct. 12, 1971
[73] Assignee Siemens Aktiengesellschaft
Munich, Germany
[32] Priority June 18, 1965
[33] Germany
[31] S 97685

[54] CHARACTER RECOGNITION METHOD AND APPARATUS
32 Claims, 10 Drawing Figs.

[52] U.S. Cl. .......... 340/146.3AE
[51] Int. Cl. .......... G06k 9/00
[50] Field of Search .......... 340/146.3; 235/61.115, 61.115 CR, 92

[56] References Cited
UNITED STATES PATENTS
3,408,485 10/1968 Scott et al. .......... 235/92
3,178,688 4/1965 Hill et al. .......... 340/146.3
3,430,198 2/1969 Gattner et al. .......... 340/146.3

*Primary Examiner*—Daryl W. Cook
*Assistant Examiner*—Thomas J. Sloyan
*Attorney*—Birch, Swindler, McKie & Beckett

ABSTRACT: This invention relates to a method of, and apparatus for, effecting character recognition and, more particularly, to such a method and apparatus providing for the recognition and identification of the structure or configuration of scanned characters. The character recognition method and apparatus of the invention has particular applicability to recognition methods and apparatus wherein character structures are defined by one, or a composite of more than one, form elements, each form element being of a predetermined, recognizable configuration. Upon the detection and recognition of one or more form elements in scanning a given character, the detected form elements are analyzed and combined to identify the character thus scanned.

CHARACTER RECOGNITION METHOD AND APPARATUS

CROSS REFERENCE TO RELATED APPLICATION

Applicants claim priority from corresponding German application Ser. No. S97,685, filed June 18, 1965.

The method and apparatus of the invention provides for tracing the line portions of a detected character, and particularly the line portions defining the form elements thereof, and for recognizing and indicating the continuity of such traced line portions. Inadvertent interruptions in a given line portion do not frustrate the tracing function, and traced line portions which terminate prior to the outer or back boundary of the scanned character are recognized and suitably identified throughout the subsequent scanning of the remaining portion of the character. The tracing and identification of the line portions in this manner, in accordance with recognized form elements permits more accurate recognition and identification of the structure of a detected character and, for example, provides an indication of the manner of interconnection of the form elements of a single character.

The invention is set forth hereafter in a system wherein characters are automatically or mechanically recognizable, and, particularly, through detection by scanning of the character configuration in accordance with a predetermined raster or scanning screen. Although not to be interpreted as limiting in any manner, the characters illustratively may be set forth on a white background in solid black lines defining the character. The scanning screen or raster may comprise a plurality of vertical, successively scanned columns and be of a size commensurate with the dimensions of the characters to be scanned. Scanning of a character in accordance with the scanning raster produces a black segment in each scanning column for the portion of the column corresponding to the coincident with a line portion of the character. Conversely, scanning of the white background produces a white segment in a scan column.

The invention described hereinbelow is not concerned with the actual determination or recognition of simple form elements, for example, straight lines of converging line portions, because devices of this nature are well-known, and these conventional devices may be used with the invention disclosed herein. An example of such well-known character recognition devices may be found in U.S. Pat. No. 3,430,198.

A first register is provided having a number of register positions for registering the scanning signals derived from a single scan column. Thus, scan signals representing a black segment are registered in the register in the position corresponding to the position of the black segment in its associated scan column.

A second register is provided having a number of register positions equal to or exceeding the maximum number of black segments normally expected to be encountered in scanning any of the characters of a class to be identified. The register positions are assignable to each black segment represented by scanning signals of a given column registered in the first register. Simultaneously with the registration of the black segment in the first register, an information signal identifying the line portion of the scanned character to which the register black segment corresponds is registered in the second register in the position assigned thereto. A black segment detected in a succeeding column scan, in subsequent scanning of the character, is compared with the previously registered black segment of a preceding column scan to examine whether they occupy corresponding positions in their respective columns, and thus whether a spatial connection exists between their corresponding line portions. The existence of a spatial connection is defined to mean that the line portion being scanned is continuous, within the resolution of the successive scans column. The information identifying the black segment of the preceding scan column is readout of the second register and, if the spatial connection condition is satisfied, is registered again in the second register in the position thereof assigned to the black segment of the succeeding scan column. The identifying information for each such black segment may appropriately identify a recognized, predetermined form element of the character which includes the line portion to which the described black segment corresponds.

The invention therefore provides a simple and efficient, highly accurate means for tracing lines and line portions which define a character to be scanned and identified. The invention also provides for tracing the line portions in accordance with the form elements of a character to be recognized. The tracing of the line portions which define a recognized form element may also be effected in accordance with the subsequent recognition of a form element formed by the traced line portions, and to indicate the interconnection or relationship of such previously and subsequently recognized form elements. Thus, the invention provides for greatly increased accuracy in the description of the characters scanned and reduces and avoids ambiguities which might occur in the description, such as those resulting in systems which recognize and operate upon only the form elements of a character. The increased accuracy in description of the characters is also of substantial importance since it permits the recognition of characters of more complicated configurations.

The circuit requirements for performing the recognition method as thus described are of relatively low complexity and relatively low cost. The registration of the line portion identifying information for each registered black segment, which provides the accurate comparison of black segments of successive column scans for determining spatial connections between the corresponding line portions, does not require that the scanning system itself be guided or otherwise operated to trace directly any given line of the character. Scanning control means required for such direct line tracing capabilities are very complex and expensive.

By contrast, the scanning control means of the invention may be of a continuously repeating type which scans the raster scan columns in a repeating succession, in accordance with predetermined time controls. Such a scanning control means is conventional and well known in the art and, due to its relatively uncomplicated circuit requirements, is low in cost.

In accordance with a further embodiment of the invention, special controls may be provided which become operative upon the ascertaining of a divergence or separation of portions of a line comprising a given form element. The identification of a divergence or other form element may be effected through separate recognition systems. A form element containing a divergence, or a divergence form element, may present two line portions, or two divergence form element portions in a single column scan. In accordance with the invention, simultaneously with the recognition of such a divergence form element, in a given scan column, the black segment of the column corresponding to the lower or most recently scanned divergence element form portion is registered. There is also registered at the register position assigned to the described black segment, information appropriately identifying the form element portion to which the black segment corresponds. Further, there is registered at a register position assigned to the preceding or earlier scanned, upper black segment of the given scan column, information which identifies the preceding black segment as representing the upper divergent portion of the form element.

In accordance with a further embodiment of the invention, divergence and convergence of portions of a line representing a form element may be recognized to identify an enclosed or completely encircled form element. Information identifying both upper and lower divergence form element portions of a form element are registered in positions assigned to the corresponding black segments. The line portions comprising the upper and lower divergence portions may subsequently converge, and such convergence may be recognized as defining a convergence form element. The continuous tracing of the form element positions, initially recognized as a divergence form element and subsequently as a convergence form element, results in the recognition of an enclosed form element.

In accordance with a preferred embodiment of the invention, the scanning is effected in a point-by-point method for each column of the raster. Thus, for each column, a predetermined number of information bit locations are provided from each of which a scanning information bit is derived. As described previously, for each portion of a column corresponding to a line of a character to be scanned, a black segment of the scanned column is produced. For each information bit location within the black segment of a scan column, there is produced a "1" bit output. Conversely, for the portions of the column corresponding to the white background, or white segment of the column, there is produced a "0" bit output. The scanning signal outputs may conveniently be described as trains of information bits and thus as trains of "1" bits and "0" bits corresponding to the black and white segments, respectively, for each scan column. The number of "1" and "0" bits in each train thereof will vary with the length of the black or white segments, respectively, of a scan column and thus with the scanning of line portions of the character or the background.

The bits of a train of information bits resulting from scanning a given column are registered in sequence in the first register. The first register may comprise a shift register having a number of register positions equal to the number of bit positions in a given column, and thus effecting a registration of a given information bit for a column scan period. Each train of "1" bits is thereby registered in the first register in a position of the latter, relative to its associated train of information bits, in accordance with the position of the corresponding black segment in the corresponding scan column. Substantially simultaneously with the registration of a train of "1" bits in the first register, the information identifying the line portion of the corresponding black segment is registered in the second register in a position assigned to that black segment for the given scan column.

The determination of spatial connection of detected line portions, in accordance with the corresponding trains of information "1" bits, requires merely that there occurs as least one coincident pair of "11" bits for the same information bit positions in succeeding scan columns. As a result, the line portion extending across the adjacent scanned columns is recognized to be continuous, within the resolution limitations thereof. When the spatial connection criterion of the existence of an "11" bit pair for successive scanned columns is satisfied, the identifying information for the preceding scan column is transmitted for registration as identifying information for the successive scan column, thereby indicating the recognition of the continuation of the line portion for the successively scanned columns. The recognition of spatial connection in this manner permits the use of conventional circuits and simplified comparison techniques and thus results in minimum cost for construction of the comparison circuits. In addition, any desired number of line portions can be traced effectively simultaneously.

In accordance with a further embodiment of the invention, there is provided means for recognizing and identifying the termination of a line portion which has been scanned and recognized to be continuous but which does not extend to the back boundary of the character. For this purpose, the back boundary is defined as the boundary coincident with the last column scanned which contains a black segment corresponding to a line portion of the scanned character. The end recognition of such prematurely terminated lines is effected through an auxiliary register capacity provided in the previously described second register. Information identifying the prematurely terminated line portion is registered in an assigned position of the auxiliary register capacity for each scan column for the duration of the character scan. The supplemental registration permits maintaining the registration of the identifying information for the terminated line portion in accordance with the last train of "1" bits resulting from scanning the line portion prior to its termination. The registration is maintained beyond the normal registration period which, as previously described, was limited to the time period of a single column scan. The registration, in fact, is maintained until completion of scanning all line portions of the character, to its end boundary.

PRIOR ART

It has been recognized heretofore in the prior art to provide for the mechanical or automatic recognition of characters, for example, letters or digits, and to identify the characters thus recognized in accordance with a suitable code, such as an electrical signal. The detection of the characters typically is effected through a photoelectric scanning system.

Systems for recognizing any of a plurality of characters and producing an identifying electrical signal in accordance with that recognition, have particular applicability to installations in the long distance communication art. The automatic recognition of characters is especially desirable for use with message processing installations. For example, electrical signals representing the detected and identified characters may be transmitted from a local or central station over long distances for controlling message processing systems such as printing mechanisms, typewriters, and accounting systems at a remote station. The automatic recognition of the characters and identification thereof by electrical signals which may be transmitted over long distances avoids the much longer time and the much greater expense required for human operators to effect such transmission.

In accordance with the prior art, character recognition may be effected in accordance with any of various known methods. One such method employs form elements of predetermined and readily recognizable configuration. One, or a composite of more than one such form elements presents characters of conventional and readily recognizable configurations. The form elements employed in a given system are those common to the type or class of characters to be recognized by the system. Examples of two such classes of characters are letters and digits. Typical form elements are recognized as the separation or divergence and/or the joining together or convergence of portions of a line. The line portions themselves may be arcuate, may include acute or obtuse angles, or may be straight lines. In the scanning of a character to be recognized, the form elements of a given character are ascertained and compared with predetermined combinations and permutations of form elements which are known to define each character of the class of characters. A few signals, each related to a given form element, transmitted in a proper order to indicate the combination of the form elements, therefore may define each of a plurality of characters.

One prior art character recognition system is taught in Deutsche Auslegeschrift 1,095,026. Scanning signals produced from scanning a character by a scanning system are converted into a code. The code is introduced into a shift register having a registration time equal to the time duration for scanning a single scan column. The code conversion is effected in accordance with the corresponding trains of information bits in each preceding scanning column. The converted signal elements which, for example, may have six possible signal conditions or states representing the detected information, are then applied to the shift register and replace the preceding signal elements registered therein. The recognition of certain basic character form elements is then effected either through the appearance within a given column of certain specified converted signals or, from the appearance within adjacent columns of specified and corresponding pairs of converted signals. There is further provided pyramid system known as a pyramid circuit which permits comparison of the plurality of basic forms in various combinations with each other. The pyramid circuit determines the character detected and represented by the registered trains of converted signal elements. Although the system thus described permits ascertaining the form elements contained in scanned characters, there is no provision for describing or identifying the characters in a more accurate manner with regard to their structure and, more specifically, with regard to the form portions or lines which comprise a scanned character.

Another prior art character recognition system is taught in U.S. Pat. No. 2,956,264. In accordance with this system, the inclination of the uppermost line of a character is determined. This determination is effected by the generation of a selected signal such as "1" bit signal, which is maintained from the beginning of the first scanned column until recognition and identification of the beginning of the first black segment of the scanning column, corresponding to the first scanned line portion of the character. The "1" bit signal controls an integration and register circuit, the final voltage of which represents an analog signal value in each case, which corresponds to the position of the beginning of the black segment relative to the initiation of the column scanned. A similar analog signal is produced by the register circuit, under the same conditions, for each successive column. The analog signals thus produced are converted into a pulse of respectively corresponding phase position. The pulses thus derived are conveyed to the trigger input of a first bistable switching device and to the reset input of a second bistable switching device. The scanning signals produced by scanning the corresponding scan column for each such controlled phase signal are applied to the other input of each of the first and second bistable switching devices. The activation of one or the other of the bistable switching devices therefore indicates a positive or negative inclination of the line, respectively. A measure of the degree of inclination may be obtained from a further integration and register circuit connected to the switching devices. Character forms are then identified from the inclination information.

Both the system of the U.S. Pat. No. 2,956,264 and that of the Deutsche Auslegeschrift 1,095,026 therefore do not permit providing a more accurate description of the characters with regard to their specific line structures, and relate merely to identification of the basic forms thereof.

German patent application S74050 IX *c*/43*a* provides, relative to the foregoing prior art systems, a more accurate character recognition system based on description of the component line portions of the character. In accordance with this system, segments of a scan column, corresponding to portions of lines of a character scanned in the column, i.e., black segments, are registered in accordance with their respective positions within the scan column. The black segments of each successive scan column is compared, in accordance with its own position within its respective scan column, with the registered black segment of the preceding scan column to determine the existence of a spatial connection of the corresponding line portions. Where a spatial connection is recognized, the subsequent black segment is registered. Thus, lines of the character are traced for effecting the character recognition.

In none of the prior art systems, however, is there provided the combined comparison of the recognition of the basic forms of a class of characters with the tracing of the line portions of the basic forms. More particularly, the prior art systems which provide only for the recognition and identification of basic form elements do not provide information regarding the nature of the line portions defining the form elements. Conversely prior art systems providing for tracing of the line portions of a character fail to provide recognition of form elements of the character defined by the traced line portions.

Prior art systems providing line tracing through complex control of a scanning beam are very complex and expensive. Conversely, prior art systems which provide line tracing through comparison of scan column segments for each of a plurality of successive scan columns effect the determination of spatial connection of the line portions corresponding to the segments with relation only to the position thereof in the given scan columns. Such systems therefore do not operate on the additional recognition of the basic character form, of which the scanned and detected line portions form a part.

OBJECTS OF THE INVENTION

These and other defects and limitations of prior art character recognition systems and methods are overcome by the method and apparatus of the invention.

It is therefore an object of this invention to provide an improved character recognition method and system.

Another object of this invention is to provide an improved character recognition method and system wherein line portions of a character to be identified are traced throughout the lengths thereof.

A further object of this invention is to provide a character recognition method and system employing a repetitive sequential scan raster wherein black segments of each scan column, corresponding to line portions of a character being scanned, are compared with black segments of a next preceding scan column to determine spatial connection of the line portions corresponding to the black segments.

Still another object of this invention is to provide a character recognition method and system having a repetitive and sequential scan raster wherein a black segment of each scan column corresponding to a line of the character being scanned is registered according to its position within the scan column and wherein, upon determination of spatial connection of a black segment of a successive scan column with a previously registered black segment of a next preceding scan column, information identifying the line portion of the preceding black segment registered in a position assigned thereto is registered for each next succeeding spatially connected black segment in a register position assigned thereto.

Still another objective of the invention is to provide a character recognition method and system having a continuous and successive scan raster wherein a black segment of each scan column representing a line portion of a character being scanned is identified as to its position within the scan column and with respect to a recognized form element of the character, of which the line portion forms a part.

A further object of this invention is to provide a character recognition method and system having a repetitive and continuous scan raster wherein black segments of each scan column corresponding to a line portion of a character being scanned are compared with black segments of the next preceding scan column to determine a spatial connection between the corresponding line portions for tracing the line portions, and wherein auxiliary registration is provided for identifying line portions of the character which terminate prior to the outer boundary of the character structure.

Still a further object of this invention is to provide a character recognition method and system wherein line portions of a character to be recognized are traced in accordance with recognition of form elements of the character formed by the traced line portions to identify the relationship of the form elements in the character.

Still another object of the invention is to provide a character recognition method and system having a repetitive, continuous scan raster wherein first and second black segments of successive scan columns corresponding to first and second line portions of divergent and convergent form elements of a scanned character are registered and the first and second black segments of each subsequent scan column are compared with the previously registered first and second black segments of the next preceding scan column to determine spatial connection of the corresponding line portions for identifying an enclosed form element.

Another object of the invention is to provide an improved character recognition method and system which is of simplified construction and reduced costs and which provides tracing of line portions in accordance with recognition of the form element of the character including the traced line.

These and other objects of the invention will become apparent as the following description proceeds.

DESCRIPTION OF THE INVENTION

In the drawings:

FIG. 1 diagrammatically indicates selected scan columns of a repetitive successive scan raster for scanning a character and the black segments of the selected scan columns corresponding to certain line portions of the character;

Figure 3:
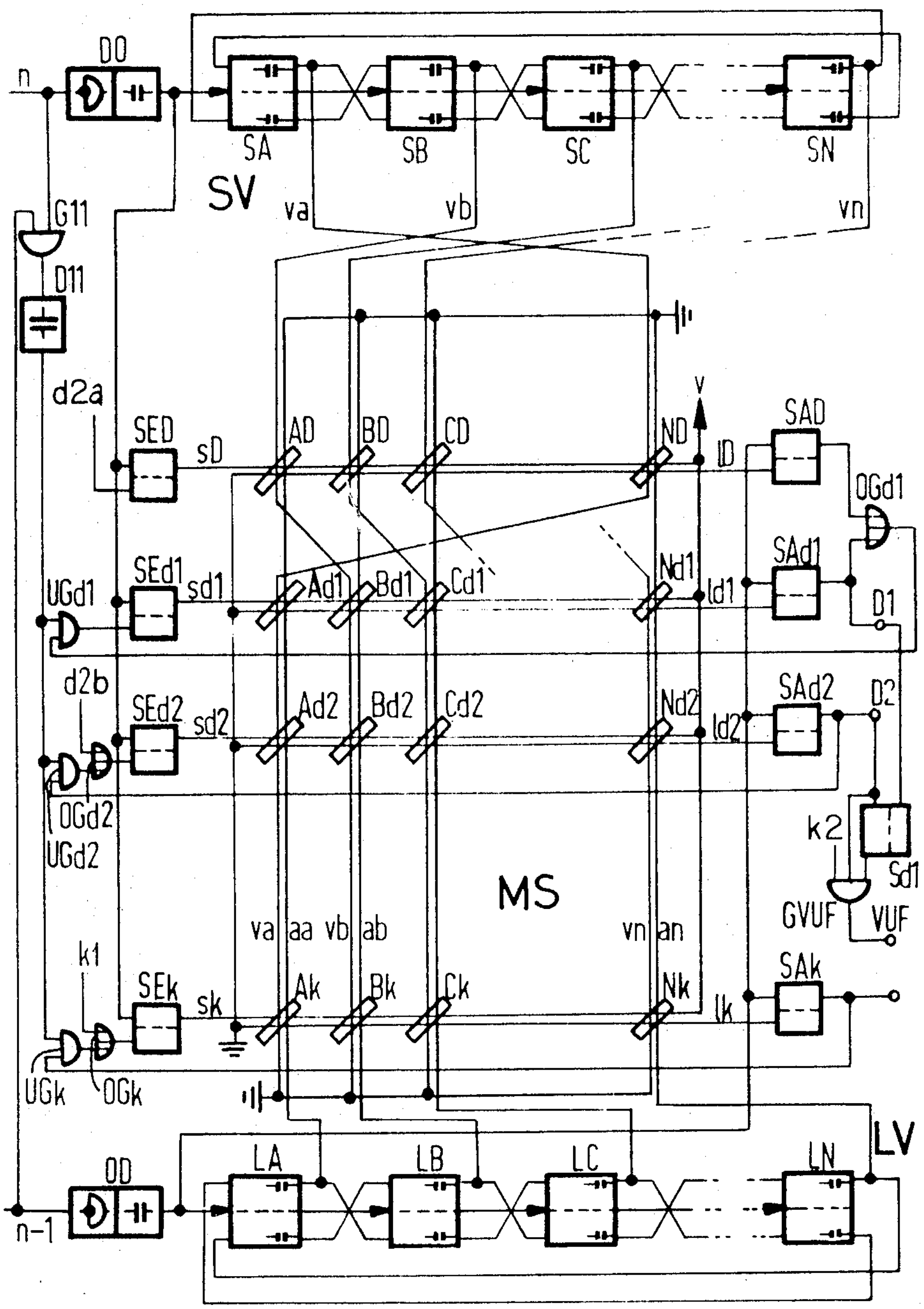
FIG. 3 shows, partly in schematic form and partly in block diagram form, registration and control means for effecting tracing of line portions of a character in accordance with the system of FIG. 2.
Figure 4:
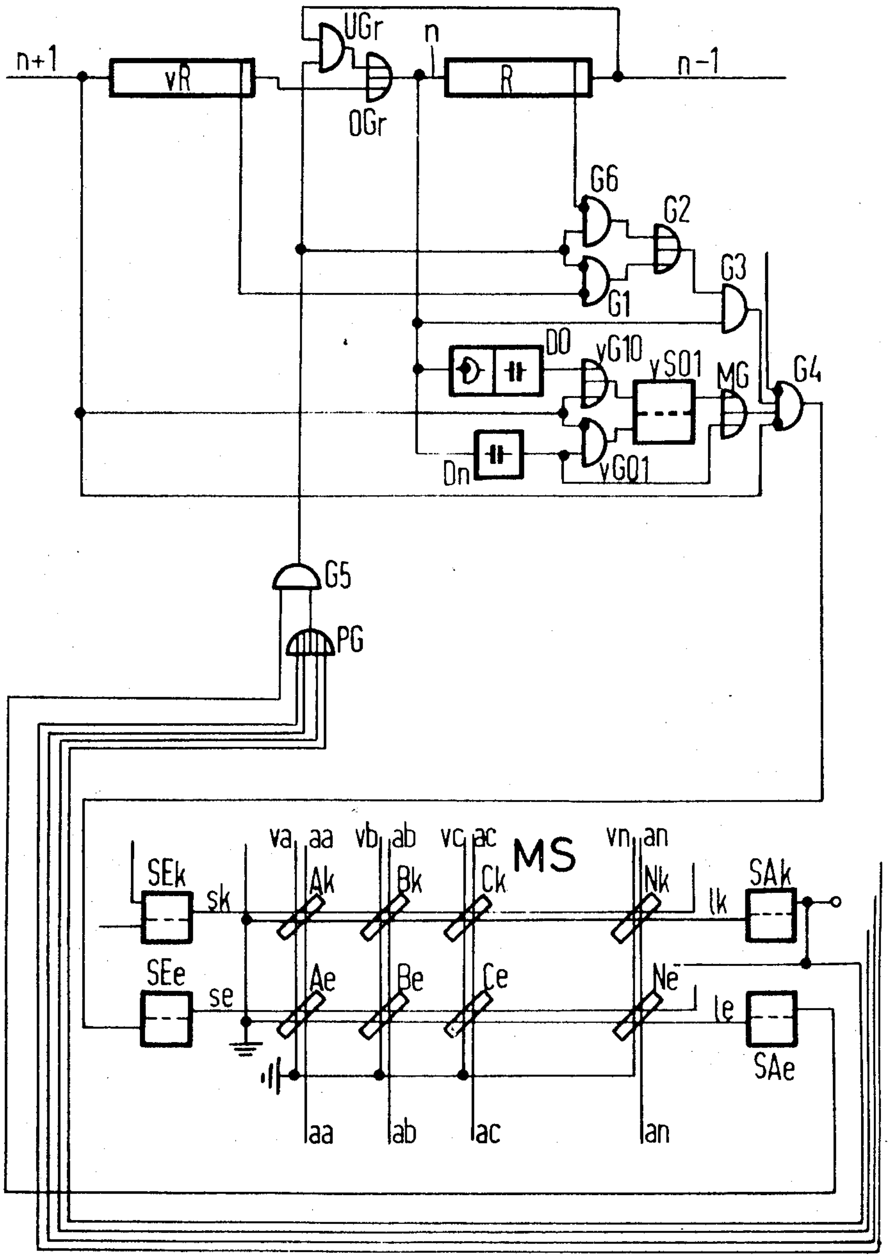
FIG. 4 shows, partly in block diagram and partly in schematic form, a modification of the system of FIG. 3 providing for maintaining registration of prematurely terminated, traced line portions.

FIGS. *5a* to *5f* show various illustrative circuit structures which may be employed in the systems of FIGS. 3 and 4.

FIGURE 1

Figure 1:
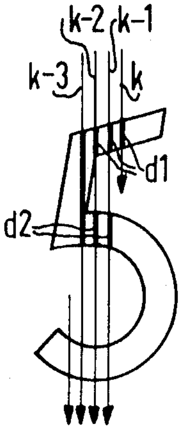

In FIG. 1 there is diagrammatically indicated a character "5" on which are superimposed a plurality of lines *k*–3, *k*–2, *k*–1, *k*,... representing successive scan columns of a scanning screen or scan raster having a plurality of such column scans. The scan raster is not indicated in its entirety, although it will be understood to be of sufficient dimensions for enclosing therewithin the outer boundaries of the character "5" or other characters to be recognized.

The character "5" includes generally in the upper half thereof a form element termed "divergence" represented by the divergence of portions of the line defining the particular character "5." The divergence form element generally comprises the upper half of the character "5" and more particularly the vertical portion thereof and the generally horizontal portions extending to the right from the upper and lower ends of the vertical line. The character "5" is shown by equidistant, double lines enclosing therewithin an area of the conventional configuration of the character "5; " the enclosed area thus defined may be represented by a single solid line, however. The double equidistant lines may be recognized as appropriately defining the character "5," and are shown to facilitate the following explanation of the invention.

Each of the scan columns *k*–3..., *k*,... includes a thickened portion comprising a black segment of the scan column, corresponding to the portion of the line defining the character "5" traversed by the scan column. The total number of scan columns and the spacing therebetween, and the size of the raster, is determined in accordance with the size of characters to be recognized and the resolution necessary for the recognition.

The first shown scan column, *k*–3, extends throughout the height of the vertical arm of the character "5." The remaining scan columns *k*–2. . . *k* include upper and lower black segments (*d*1) and (*d*2) corresponding to the upper and lower line portions or form element portions of the divergence form element. The black segments of the scan columns relating to other portions of the line defining the character "5" are not shown since, in the following discussion, the registration of black segments and the comparison and interpretation thereof are limited to the analysis of the divergence form element of the character "5." The other black segments which would be produced will be apparent, and the registration and other operations produced in response thereto, will be understood from the following description.

FIGURE 2

Figure 2:
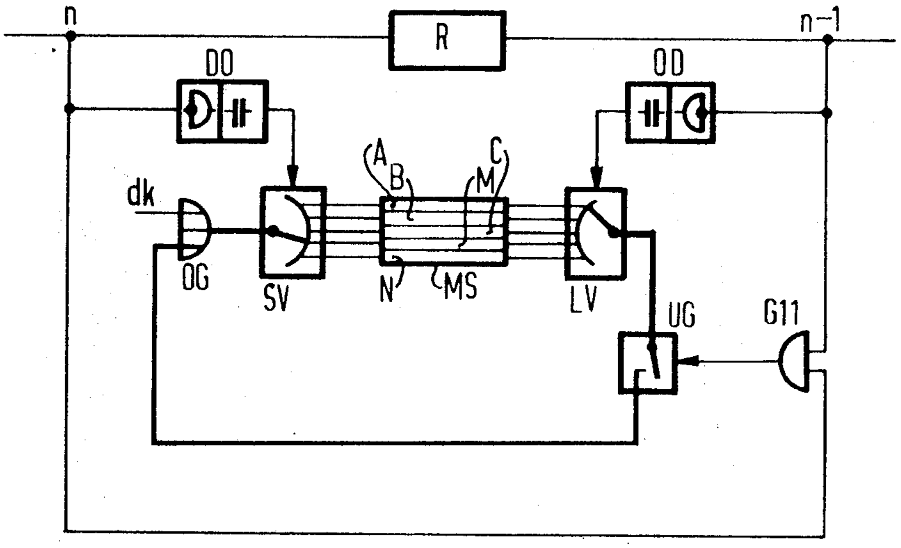
FIG. 2 shows in block diagram form a character recognition system in accordance with the invention for effecting line tracing in accordance with the scan raster indicated in FIG. 1 and the recognized form elements of a character thus scanned.

In FIG. 2 there is shown a block diagram of a character recognition system, in accordance with the invention, for registering and performing operations in response to the black segments detected by the scanning system as illustrated in FIG. 1. The scanning system more specifically provides for the generation of a train of information signals or information bits in a predetermined, periodic manner and repeated in an identical fashion, in succession, for each of the scan columns *k*–3, . . .*k*, . . . . Each black segment on a given scan column will result in the production of a train of information "1" bits. Conversely, the portion of each scan column corresponding to a background on which the character "5" is positioned will result in the production of a train of information "0" bits.

The information bits corresponding to each scan column are applied to the line (*n*) in FIG. 2 and through the latter to a register, R. The line (*n*) may be connected directly to the scanning system, or to additional circuit systems interposed therebetween. The additional circuit systems may comprise smoothing systems or pulse reshaping circuits for producing "1" bit pulses of desired wave shape and fixed amplitude on the line (*n*) for use in the system of FIG. 2. The register R includes a number of register positions equal to the number of information bits in a single scan column, and thus provide for registering each information bit for the duration of one scan column period. The trains of "1" bits representing black segments are thereby registered in appropriate time sequence or position in accordance with the position of the black segments within a given scan column.

The register R suitably may comprise a shift register having a number of switching stages corresponding to the number of information bit positions of each scan column. The shifting of the information bits through the register R proceeds at the same rate as the information bits are presented on line (*n*). Therefore, one column scan period later, each registered information bit is transmitted by register R to the output line (*n*–1). The information bits on line (*n*–1) therefore correspond in identical time relationship with those on line (*n*) one column scan period earlier, and also with information bits simultaneously being presented on line (*n*) but corresponding to the next successive scan column.

The system of FIG. 2 includes a register MS having a number of register positions, A, B, C, . . . N. Each of the register positions of register MS is assignable to a given train of information "1" bits registered in register R, and thus to the corresponding black segments. A distributor circuit, SV, is associated with the register MS and transmits and identifying information signal to the assigned register position, A, B, C, . . . N.

A differentiation circuit, DO, controls the output position of the distribution circuit SV in accordance with the assignment function thereof. Differentiation circuit DO is connected at its input to the line (*n*) to receive the information bit pulses from the scanning system. The circuit DO produces an output which is applied to the distribution circuit SV only in response to a transition from information "1" bits to information "0" bits, thereby recognizing the transition from the corresponding black, to the following white, segment of a scan column. Thus, only upon termination of each train of "1" bits is an output signal produced by the circuit DO to effect advancement of the output of the distribution circuit SV. The advancement of the output is indicated by a rotary contact arm providing selective connection to a plurality of output leads of the distribution circuit SV, which output leads correspond to the register positions A, B, C, . . . N of the register MS.

An interrogation circuit, LV, is associated with the output side of the register MS and includes a plurality of input lines associated with each of the register positions A, B, C, . . . N of the register MS. The plurality of input lines are selectively interrogated, as illustratively indicated by a moveable contact arm of the interrogation circuit LV. It will be appreciated that the distribution circuit SV and the interrogation circuit LV are substantially similar in their construction. The interrogation circuit LV derives from the register MS, at preselected time intervals and under predetermined conditions, the information registered in the register MS and which identifies the line portion corresponding to a train of information "1" bits registered in the register R. The output of the interrogation circuit LV is connected, through a selectively opened and closed gate circuit, UG, and a decoupling circuit, OG, to the distribution circuit SV. The decoupling circuit OG further includes an input line (*dk*) on which is produced the identifying information. The identifying information may comprise an electrical signal corresponding to and identifying a distinguishing characteristic or peculiarity of a line portion, such as the form element defined by the line portion.

The interrogation circuit LV is connected at its control input to a differentiation circuit, OD, operating similarly to the circuit DO to emit an output signal only upon the occurrence of a signal transition from a "1" bit to a "0" bit at its input. The input of differentiation circuit OD is connected to the output line (*n*—1) of register R. Since the identical train of information bits from a given scan column is produced on line (*n*—1) exactly one column scan period after the presentation thereof on line (*n*), differentiation network OD will produce an identical set of output pulses to advance the contact arm of interrogation circuit LV in the same manner as the distributor circuit SV, but delayed by one column scan period.

The gate circuit UG is controlled by a comparator circuit, G–11, which may comprise an AND gate. The comparator circuit G–11 compares the train of information bits of a given scan column with the train of information bits of the next preceding scan column. The comparison is effected to determine the existence or absence of a spatial connection of the line portions corresponding to the black segments, represented by the trains of "1" bits, in two successive scan columns. For this purpose, the comparator circuit G–11 may conveniently comprise an AND gate having a first input connected to the output line (*n*—1) of the register R and a second input connected to the input line (*n*) associated with the register R. There are therefore presented simultaneously to the two inputs of the comparator gate G–11 the trains of information bits of two successive scan columns. Gate G–11 produces an output upon the simultaneous occurrence of a "1" bit at each of its input terminals to enable the gate UG to be capable of transmission. When gate UG is enabled, the output of interrogation circuit LV is connected through the decoupling circuit OG to the distribution circuit SV and thence to the register MS.

It will be appreciated that the simultaneous occurrence of information "1" bits at the two input terminals of gate G–11 requires that the black segments of successive, scan columns of the raster are spatially connected, i.e., that the corresponding line portions identified by the black segments are spatially connected, within the resolution capabilities of the scan columns, for at least one pair of identical information bit positions in the successive scan columns.

The distribution circuit SV and the interrogation circuit LV conveniently may be provided by rotational stepping switches. Thus, in a well-known manner, the circuits SV and LV may be advanced in step-by-step or sequential fashion in response to output signals form their respectively associated differentiation circuits DO and OD to contact, in sequence, each of the output and input lines thereof, respectively. Thus, each of the circuits SV and LV is selectively and sequentially advanced into contact with each of the register positions A, B, C, ... N, A, ... of register MS in a continuous and cyclically repeating fashion.

The registration and comparison functions of the system of FIG. 2 will now be described in greater detail with respect to the canning system diagrammatically illustrated in FIG. 1. As discussed previously, a train of information bits produced from the scanning of a given scan column and presented on line (*n*) is presented in identical fashion one column scan period later on the line (*n*—1) due to the delaying function of shift register R. Thus, for each information bit presented on line (*n*—1) there appears at the identical time an information bit on line (*n*) for the same information bit position of the next successive scan column.

Upon each transition from a black segment to a white segment, and thus from a "1" bit to a "0" bit, distribution circuit SV is advanced by one step. As a result, the register position of register MS previously connected through circuit SV to decoupling circuit OG is released and the next successive register position connected thereto. In an identical fashion, but one scan column period later, interrogation circuit LV is advanced one step so that there is connected with the input of the circuit LV the same register position of the register MS with which the distribution circuit SV was connected exactly one scan period previously. It should be recognized of course that the distribution circuit SV may have advanced through one or more further positions and thus be connected to a more greatly displaced register position of the register MS, in response to one or more intervening "1–0" information bit transitions occurring on the line (*n*).

More specifically, and with regard to the scan columns shown in FIG. 1, the black segment of scan column (*k*–3) is continuous from the top of the upper horizontal line to the bottom of the upper arcuate line portion, after which a "1–0" transition occurs. In the succeeding scan columns, *k*–2, *k*–1, . . . the single black segment of scan column (*k*–3) is divided into two portions identified as the upper and lower divergence portions corresponding to the black segments (*d*1) and (*d*2), after each of which a "1–0" transition occurs. The upper and lower divergence portions will be recognized, respectively, and the uppermost line portion of the character "5" extending substantially horizontally to the input in FIG. 1, and as the upper part of the arcuate portion of the character "5".

In the course of scanning the character "5" in scan column (*k*–2), a black-to-white or "1" bit to "0" bit transition occurs as the scanning beam proceeds below the lower edge of the uppermost line portion of the character "5," and thus below the segment (*d*1). As a result of this transition, distribution circuit SV is advanced by one step and may be assumed to be connected to the register position N of register MS. The scanning of column (*k*–2) continues and, upon reaching the upper edge of the upper arcuate portion of the digit character "5," and thus the beginning of the segment (*d*2), a divergence of the line portions will be recognized. More particularly, a circuit (not shown in FIG. 2) may be provided to recognize the divergence form element formed by the divergent line portions.

In summary, the appearance of a divergence form element is recognized when the scanning of scan column (*k*–2) reaches the upper edge of the arcuate portion of the character "5." The recognition of the divergence is not part of this invention and is not described herein. However, such recognition techniques are well known.

The form element recognition is employed in accordance with the invention for producing a signal which is applied to the line (*dk*). This signal comprises the information identifying a peculiarity of the line portion being scanned. More particularly, in the given example, the peculiarity is the divergence of the line portions.

The production of the information signal representing recognition of the divergence characteristic on the line (*dk*) and, thus at the input of the decoupling circuit OG therefore occurs simultaneously with the beginning of the train of information "1" bits corresponding to the black segment or lower divergence portion (*d*2) of line (*k*–2), and thus simultaneously with the transmission of the corresponding train of "1" bit pulses to the register R. Since distribution circuit SV was advanced in response to the "1–0" transition following the upper divergence portion (*d*1), in scanning of the scan column (*k*–2) to the register position N of register MS, the information identifying the line portion corresponding to the lower divergence portion (*d*2) is registered in the register position N.

Means (not shown in FIG. 2) may also be provided whereby information identifying the upper divergence portion or line portion corresponding to the first black segment (*d*1) on scan column (*k*–2) may simultaneously be registered in register position M of the register MS. This latter registration function will be explained hereafter.

During continuation of the scanning of scan column (*k*–2), the scan position proceeds below the lower edge of the upper arcuate portion, i.e., from the black segment (*d*2) to the following white segment of the scan line (*k*–2), producing a "1–0" signal transition on line (*n*). As a result, distribution circuit SV is advanced by one position to be connected to the register position A of register MS. Subsequently, in the scanning of column (*k*–2) the lower half of the right arcuate portion of the character "5" will be detected and an information signal identifying the characteristics of this line portion will be produced on line (*dk*) for registration in register position A. In completing the scan of column (*k*–2), the transition from the black segment thereof, corresponding to the lower arcuate portion, to the white segment of the background portion will produce a "1–0" signal transition which again is detected by differentiation circuit DO to advance the distribution circuit DO to advance the distribution circuit SV to the next register position B.

For the scanning conditions indicated in FIG. 1, the "1–0" signal transitions in the trains of information bits on line (*n*) are reproduced by register R one scan column period later on line (*n*–1) and are detected by differentiation circuit OD. Circuit OD therefore operates to advance interrogation circuit LV to the positions of register M occupied by circuit SV one period earlier. As a result, interrogation circuit LV is connected to register position M of register MS, in response to the information "1–0" bit transitions from scan column (*k*–3), at the time distribution circuit SV has advanced to position B in response to the information "1–0" bit transitions from scan column (*k*–2).

As discussed previously, the information registered at position M identifies the upper divergence portion (*d*1), or upper form element portion. The upper element portion of the character "5" extends substantially horizontally, as noted previously, an is continuous from the scan columns (*k*–2) to (*k*–1). The black segment (*d*1) of scan column (*k*–1) corresponding to the upper line portion, and thus the upper portion of the divergence form element, produces a train of information "1" bits which is presented on line (*n*). During the time interval within which this train of the information "1" bits corresponding to the black segment (*k*1) of the scan column (*k*–2), also corresponding to the upper divergence portion. There, therefore, appears simultaneously on the lines (*n*) and (*n*–1) a plurality of "1" bits corresponding to the upper divergence portion (*d*1) of the scanning columns (*k*–1) and (*k*–2), respectively. The simultaneous presence of these trains of "1" bits results in at least one and typically a plurality of simultaneously occurring pairs of "11" bits at the inputs of the comparator circuit G–11. Gate G–11 is thus activated to enable gate UG.

Interrogation circuit LV is at this time connected to the register position M of register MS whereby the information there registered and identifying the upper divergence form element portion corresponding to the black segment (*d*1) of column (*k*–2) is transmitted over gate circuit UG to the lower or second input of decoupling circuit OG for application through distribution circuit SV to the register MS.

Distribution circuit SV is currently connected to register position B, whereby register position B is assigned to the train of information "1" bits currently being registered in register R. This train of "1" bits represents the black segment (*d*1) of scan column (*k*–1) corresponding to the upper divergence form element portion. The identifying information from register portion M is transmitted to register position B. The information registered at position B therefore again identifies the upper form element portion corresponding to the black segment (*d*1). As the scanning of scan column (*k*–1) proceeds below the lower edge of the upper divergence form element portion and thus the corresponding black segment (*d*1), the transition from "1" bits to "0" bits is recognized by differentiation circuit DO to advance distribution circuit SV to the next successive register position C of register MS.

For the scanning conditions indicated in FIG. 1, shortly after this time, the train of information "1" bits on line (*n*–1) corresponding to the upper divergence form element portion (*d*1) of the scan column (*k*–2) is terminated and a train of "0" bits occurs, which transition is recognized by differentiation circuit OD to advance interrogation circuit LV to the next register position, namely position N. As the scanning of column (*k*–1) continues, the detection of the upper edge of the arcuate portion of the character "5" initiates a subsequent train of information "1" bits representing the lower divergence form element (*d*2). For the scanning conditions indicated, a train of information "1" bits corresponding to the scanning of the lower form element portion corresponding to the black segment (*d*2) of the preceding scan column (*k*–2) simultaneously appears on the line (*n*–1), whereby G–11 is activated for enabling gate UG. Activation of gate G–11 in response to the simultaneous occurrence of an "11" bit pair at its input terminals, as previously described, comprises a recognition of the spatial connection of the lower form element portions corresponding to the black segments (*d*2) of the successive scan columns (*k*–2) and (*k*–1).

Interrogation circuit LV is at this time connected to the register position N, the information registered therein identifying the lower form element portion (*d*2) of the previous scan column (*k*–2). The information is transmitted therefore through the interrogation circuit LV, the enabled gate UG, the decoupling circuit OG, and the distribution circuit SV to the register position C, to which the circuit SV is now connected.

In accordance with the foregoing description, therefore, as the scan of column (*k*–1) is continued and proceeds below the lower edge of the upper arcuate portion of the character "5," a "1–0" transition is detected which advances distribution circuit SV to connect to the next successive register position, shown to be position M of register MS. Substantially simultaneously therewith, there occurs on line (*n*–1) the "1–0" transition associated with the black segment (*d*2) of the previously scanned column (*k*–2); this "1–o" transition is detected by CIRCUIT OD for advancing interrogation circuit LV to the next successive register position A. Similarly, detection of the "1–0a" transition, occurring as the scan proceeds below the lower edge of the lower part of the right arcuate portion of the character "5," by circuit DO causes distribution circuit SV to advance to register position N; further, due to the similarly produced "1–0" transition of the information bits on line (*n*–1) resulting from the proceeding scan of column (*k*–2), interrogation circuit LV is advanced to register position B.

In the subsequent scan of column (*k*), a train of information "1" bits representing the black segment (*d*1) thereof is produced on line (*n*), substantially simultaneously therewith a train of information "1" bits is produced on line (*n*–1), representing the black segment (*d*1) of the preceding scan column (*k*–1). Comparator circuit G–11 therefore again is actuated by an "11" bit pair, resulting from the spatial connection or continuity of the upper divergence portion between the black segments (*d*1) of the currently scanned column (*k*) and of the previously scanned column (*k*–1), and enables gate UG. As a result, the information registered previously in position B is transmitted through the interrogation circuit LV, currently connected to position B, and the distribution circuit SV to the register position N to which the latter is currently connected.

The register position N therefore is assigned to the black segment (*d*1) of scan column (*k*) and receives the information identifying the upper divergence portion corresponding thereto; the identifying information is registered in register position N substantially simultaneously with the receipt of the train of information "1" bits currently registered in register R and corresponding to the black segment (*d*1) of scan column (*k*).

In the foregoing description, the assignment of register positions of the register MS and the registration therein of identification information relating to trains of information "1" bits corresponding to detected black segments of a character being scanned was directed to the divergence form element of the single character "5." As described more fully hereafter, any of a plurality of characters, and thus of recognizable form elements, may be recognized and identified in accordance with the method of operation and system of the invention.

Regardless of the number of recognizable character form elements and of characters to be recognized, the system of FIG. 2 requires only a single register R having a number of register positions corresponding to the number of information bit positions of a single scanning column. The trains of information bits generated in response to scanning of each such column are applied in sequence to the register R and produced one scan column period thereafter on the line ($n$—1). The registration of the trains of information bits in register R is in accordance with the relative positions of the corresponding black segments representing portions of the line defining the character, as scanned in each scanning column. The register MS has a register capacity corresponding to the maximum number of trains of information "1" bits appearing in the course of a single scanning column and to the number of different identifying information signals which identify the form elements contained within the characters of a given class. A selected one of the register positions A, B, ...N of the register MS is assigned to each black segment of a scanning column in accordance with registration of the corresponding train of "1" bits relative to the positions thereof in a scanning column.

In summary, registration in the assigned register position is effected initially when the form element defined by the line portions, to which certain black segments of a given scanning column corresponds is identified. The continued registration of the identifying information in assigned register positions for subsequent scan columns requires that a black segment of a subsequent scan column and the black segment of a preceding scan line correspond to spatially connected line portions. When the foregoing conditions are satisfied, and substantially simultaneously with the registration in register R of the train of information "1" bits corresponding to the given black segment, the information identifying the line portion to which the black segment corresponds and, more specifically, the form element including the line portion, is registered in the assigned register position. The described registration and assignment of positions of the register MS is repeated for each successive scan column and only under the conditions set forth above. Thus, the registered identifying information is initially derived from the form element identification. Thereafter, for each successive column scanned, a new register position is assigned to the black segments detected in that column scanned and, if the spatial connection condition is satisfied, the register identifying information is read out and applied to the next assigned register position for the corresponding, successive scan column. The system of the invention therefore provides for the tracing of line portions of a character in accordance with an initial recognition of a form element including the lines of the element which are traced. The line tracing provides a more accurate description of the structure of the character than can be gained from the mere ascertaining of the form elements contained therein. As will be described hereafter, the line tracing also provides for determining the connection or relationship of plural form elements of a character.

In FIG. 3 there is shown in further detail certain of the circuit systems employed in the system of FIG. 2. More particularly, there is shown, partly in schematic and partly in diagram form, the components of the register circuit MS, the distribution circuit SV, the interrogation circuit LV, the gate circuit UG, and the decoupling circuit OG of FIG. 2 and indicated by identical labels in FIG. 3.

Register MS includes a rectangular register matrix having intersecting columns and rows. The columns comprise register elements AD, A*d*1... A*k*; B*d*1,...B*k*;... ND... N*d*1,... N*k*.

The matrix rows comprise the rows of register elements AD, BSD,... ND; A*d*1, D*d*1;...A*k*, B*k*,...N*k*. Thus, in a conventional manner, each matrix element in each matrix column.

As described previously, the trains of information "1" bits are registered in register R of FIG. 2, not shown in FIG. 3. The columns of register elements are individually assignable to each train of information "1" bits in a given column scan for the registration of corresponding identifying information, and thus are of a number equal to or exceeding the maximum number of black segments or trains of information "1" bits resulting from a single column scan for any of a given class of characters. The matrix rows are assigned in accordance with a particular identifying information. An information signal identifying form element of a scanned line portion therefore is registered in the register element located by the assigned matrix column and row. For example, and information signal identifying the lower form element portion (*d*2) in a given one of the scan columns in FIG. 1 as a divergence form element is registered in row of register elements A*d*2, B*d*2, ...N*d*2 assigned to that form element and in the particular element of the column assigned to the train of information "1" bits for that scan column. However, if desired, it is also possible in the alternative to register the identifying information in register elements of more than one matrix row.

As shown in FIG. 3, each of the register elements AD...N*k* comprises a magnetic core traversed by a setting line *va*, *vb*...*vn* associated with the distribution circuit SV, a read-in line SD, *sd*1...*sk* associated with the registers SED, SE*d*1..., SE*k*, an interrogate line *aa*, *ab*... *an* associated with the interrogation circuit LV and a readout line iD, 1*d*1,...1*k*.

Distribution circuit SV comprises a closed ring shift register having a plurality of registration or shifting stages SA, SD, ... SN. The number of stages SA... SN correspond to the number of columns of register element of the register MS and thus to the predetermined number of black segments or trains of information "1" bits occurring in a scan column for any character of a given class of characters. Input shifting pulses are applied to the first stage SA from the differentiation circuit DO, the latter being connected to line N as indicated in FIG. 2. A setting line *va*, *vb*...*vn* is associated with the output terminal of a respectively associated stage SA...SN of the distribution circuit SV and with a respectively associated column of register elements. For example, setting line (*va*) traverses the register elements of the first column, namely, the register elements A*d*1, A*d*2...A*k*. The setting line (va) also traverses register element ND for a reason to be explained.

Interrogation circuit LV includes a closed ring of shift register stages LA, LB,... LN, which operate in the manner of the stages of the distributor circuit SV. The advance pulse input to the interrogate circuit LV is applied to the first stage LA thereof from the differentiation circuit OD, the latter being connected at its input to the line ($n$—1), as indicated in FIG. 2. The interrogation circuit LV is therefore advanced through successive stages in response to each "1–0" transition in a train of information bits registered during a preceding scan period in the register R of FIG. 2.

An interrogate line *aa*, *ab*,... *an* is associated with a respectively associated stage LA, LB,...LN of the interrogation circuit LV. The interrogate lines control the information readout from the register elements of a respectively associated column of the register MS. For example, the interrogate line (*aa*) connected to the stage LA traverses the first column of register elements AD, A*d*1, ... A*k*, permitting information readout therefrom only during the occurrence of an interrogate signal on the line (*aa*), as produced by an output from the stage LA.

The register elements of each matrix row are traversed by a common read-in line, shown as the lines *sd*, *sd*1,...*sk*. Each such read-in line further is associated with an information input line on which is produced an information signal identifying a predetermined character form element. As noted previously, the recognition of character form elements does not form a part of the present invention and therefore is not explained in detail in FIG. 3. However, each of the information input lines such as (*d*2*a*) and (*k*) may represent the output line of a circuit system for recognizing a character form element. By way of example, the lines (*k*2*a*) and (*d*2*b*) are connected to the read-in lines (*sd*) and (*sd*2), respectively, and the input line (*k*1) is connected to the read-in line (*sk*); the lines (*d*2*a*) and (*d*2*b*) may be connected to the output of a circuit for recognizing divergence form elements and the line ($k1$) to a circuit for recognizing convergence form elements.

The position of the matrix MS at which is registered information identifying a form element is thus determined in part in accordance with the particular row of the matrix on the read-in line of which a read-in pulse occurs. The setting information from the distribution circuit SV assigns the column, and thus the particular position in the given row at which the identifying information is recorded for a given train of information "1" bits. The registration requires setting of the magnetic core register elements of the register MS and thus requires the simultaneous energization to the perpendicular setting and read-in lines related to the given core.

The register elements of the matrix MS have common information readout lines 1D, 1$d$1, 1$d$2,...1$k$, which correspond to the rows of the matrix of register MS. For example, the readout line 1D corresponds to the first row of register elements AD, BD, CD, ... ND.

Each readout line is connected, in turn, through an AND gate and other circuits, to be described, to the read-in line 1$d$1 associated with the row of register elements A$d$1,... N$d$1, is connected through various circuits to the read-in line $sd$1.

The AND gates UG$d$1, UG$d$2,...UG$k$ associated with the various rows of the matrix each contain a second input terminal connected through a differentiation circuit D–11 to an AND gate G–11 corresponding to the AND gate G–11 of FIG. 2. The AND gate G–11 and circuit D–11 restrict the activation of the AND gates associated with the matrix rows so that the latter produce output signals for only a desired short period of time.

AS will be appreciated from the previous description of the system of FIG. 2, the AND gate G–11 is activated for each simultaneous occurrence of a pair of "1" bits; i.e., a bit pair "11", and will produce an output signal in response thereto. Differentiation circuit D–11 produces an enabling output signal only for a selected one of the bits pairs "11." For example, the selected bit pair "11" may be the first such pair which occurs or any other pair, as desired.

The enabling signal produced by the differentiation circuit D–11 is applied in common to the second input terminal of each of the AND gates UG$d$1, .....UG$k$. Thus, each of the AND gates UG$d$1,.....UG$k$, upon the simultaneous occurrence of an output signal from the readout line of the corresponding row and the presentation to the first input terminal thereof the enabling signal from circuit D–11, produces an output signal which is applied to the corresponding read-in line of the given row.

In the general description of the system operation, discussed previously with regard to the system of FIG. 2, it was noted that it may be desired to register information identifying a form element portion scanned prior to the recognition of the form element. More specifically, the black segment ($dl$) of column ($k$–2), represented by a train of information "1" bits and corresponding to the upper divergence portion of the divergence form element of the character "5" may be desired to be registered simultaneously with the registration of the information identifying the divergence form element in relation to the second scanned, lower divergence portion ($d2$). As discussed, the form element identifying information is not ascertained until the scanning of the lower divergence portion ($d2$). As discussed, the form element identifying information is not ascertained until the scanning of the lower divergence portion ($d2$) Thus, no information identifying signal could be produced on the information input line ($dk$) in FIG. 2 until recognition of the lower divergence portion ($d2$).

The ability to effect the registration of the preceding black segment ($dl$) of a given scanning column such as ($k$–2) (FIG. 1) is achieved in the register MS through the provision of the first and second matrix rows of register elements AD....ND and A$d$1....N$d$1. The information signal identifying the form element is applied through input line ($d2a$) to the first row of matrix register elements. The same information identification signal is also applied to the row of the matrix assigned to the registration of the segment ($d2$). More particularly, this row comprises the register elements A$d$2.....N$d$2 having the read-in line $sd$2. The corresponding information input line for the read-in line $sd$2 is labeled ($d2b$); since the identical identifying information signal is produced at the line ($d2b$) as at the line ($d2a$), these input lines may be identical.

The output line (1D) of the first row of matrix register elements AD....ND, and the output line (1$d$1) of the second matrix row of register elements A$d$1, ....N$d$1 are connected through various circuits to the read-in line ($sd$1) of the second matrix row. More particularly, the readout lines (1D), 1$d$1) are connected to intermediate information registers SAD and SA$d$1, respectively, the outputs of which are connected to a decoupling circuit OG$d$1, which may comprise an OR gate. The output of OR gate OG$d$1 is applied to the first input terminal of the AND gate UG$d$1. The output of the latter is connected to an input of intermediate register SE$d$1, at the output terminal of which is connected the second row read-in line ($sd$1).

The construction of the matrix MS to provide for the registration of identifying information relating to the previously scanned black segment ($d$1) simultaneously with the similar registration in the row assigned to the second scanned black segment ($d2$) is effected in the following manner. The setting lines from the distribution circuit SV are transposed by one register element for the first row of the matrix, relative to all remaining rows of the matrix. Thus, the setting line ($va$) associated with the first stage SA traverse the last register element ND of the first row and thereafter traverses the register elements A$d$1.....A$k$ of the first column of register elements. Similarly, the setting line ($vb$) connected to the second stage SV traverses the register element AD of the first column in the first row and thereafter traverses the register elements B$d$1.....B$k$ of the second column for each succeeding matrix row. A similar transposition of the setting lines for the remaining stages of the distribution circuit SV is provided, as will be apparent.

There is provided a bank of intermediate input information registers SED, SE$d$1,...SE$k$, to the output terminals of which are connected respectively associated ones of the read-in lines $s$D, $sd$1,...$sk$ and a bank of intermediate output information registers SAD, SA$d$1,...SA$k$ to the input terminals of which are connected respectively associated ones of the readout lines 1D, 1$d$1,...$lk$. Each of these registers comprises a "1" bit register. In a manner to be explained more fully hereafter, the output registers SAD...$sk$ maintain readout information during the subsequent determination of spatial connection conditions; if the latter are satisfied, the readout information thus registered by an output register is applied to the respectively associated one of the input registers SED...SE$k$. The latter maintain the read-in pulse, effecting row assignment, until a subsequent column assignment by the distribution circuit SV at which time the identifying information is then registered at the assigned register position of matrix MS.

The input registers SED...SE$k$ have reset terminals connected in common to the output of circuit DO, and are reset in response to an output from the latter following the "1–0" transition of each train of "1" bits received on line ($n$)and stored in register R, and the resultant registration of identifying information in the register position thereby assigned to the train of "1" bits. Similarly, the output registers SAD...SA$k$ have reset terminals connected in common to the circuit OD whereby the latter are reset in response to an output from the latter following the "1–0" transition of each train of "1" bits received on line ($n$–1) from register R, and thus subsequently to the spatial connection determination.

The operation of the circuit of FIG. 3 will be described in the following in accordance with the description of the circuit of FIG. 2 previously given. For convenience, the following nomenclature shall be adopted. Each of the black segments ($d$1) and ($d2$), as previously described, results in the production of a corresponding train of information "1" bit pulses; at the termination of each such train a "1–0" transition occurs.

Hereafter, these trains shall be described as the (*d*1) train and the (*d*2) train, respectively.

Since only the vertical line portion of the divergence form element is scanned in column (*k*–3), no recognition of the divergence of the line portion is effected. In scan column (*k*–2), however, the line portion has diverged, defining upper and lower portions of a divergence form element. The recognition of the divergence form element is not described herein, as mentioned previously. However, the line tracing function of the invention requires the recognition of the form element defined by the line to be traced. Thus, although distribution circuit SV is advanced by differentiation circuit SV in response to trains of "1" bits related to column (*k*–3), no registration in matrix MS for line tracing purposes is effected.

Scanning of column (*k*–2) produces a (*d*1) train. The subsequent termination of the (*d*1) train results in a "1–0" transition and causes the differentiation circuit DO to produce an advance pulse at its output terminal. For the purposes of this explanation, the advance pulse is assumed to actuate the first stage SA of the distribution circuit SV. The stage SA produces a setting pulse at its output terminal to which the setting line (*va*) is connected. The setting pulse on line (*va*) establishes a partial condition for setting, and thus registering information in, one or more of the corresponding core register elements ND and A*d*1...A*k*. Actuation of stage SA by the (*d*1) train therefore assigns the first column of cores and the core ND to the black segment (*d*1). Since the form element of the character corresponding to the (*d*1) and (*d*2) trains is not determined until scanning of the (*d*2) segment in column (*k*–2), no information identification signal is presented on the input line (*d*2*a*) for identifying the corresponding line portion as a divergence form element portion. Thus, none of the read-in lines is energized and, as a result, none of the register elements is set.

Upon the presentation on line (*n*) of the (*d*2) train resulting from scanning column (*k*–2) and the subsequent termination thereof, the "1–0" transition causes differentiation circuit DOt to produce a subsequent advance pulse at its output. The advance pulse is applied through the first stage SA, deactuating it, and to the second stage SB of the distribution circuit SV, actuating the latter. Actuation of stage SB produces a setting pulse at its corresponding setting line (*vb*)which establishes a first condition for setting of the corresponding cores AD and the cores B*d*1....B*k* of the second column of matrix. Thus, this column of the matrix is assigned to the (*d*2) train.

Upon recognition of the black segment (*d*2), as previously described, an information signal identifying the segments (*d*1) and (*d*2) as corresponding to portions of a divergence form element is produced and applied to the input lines (*d*2*a*)and (*d*2*b*). The information signal on line (*d*2*a*)actuates intermediate information register SED which produces and maintains a read-in pulse on its associated read-in line (*s*D). Similarly, the information identification signal on line (*d*2*b*) is transmitted through OR circuit OG*d*2 to the lower input terminal of intermediate information register SE*d*2 to actuate the latter. AS a result, a read-in pulse is maintained on the corresponding read-in line (*sd*2). The registers SED and SE*d*2 maintain the read-in pulses on the associated lines (*s*D) and (*sd*2) so that the subsequently produced setting pulse on setting line (*vb*) occurs concurrently therewith to set the cores AD and B*d*2. Thus, registration of the identifying information of the first and second black segments (*d*1) and (*d* 2) of column (*k*–2) is second black segments, respectively, and further in accordance with rows related to the particular identification information of the black segments. In particular, this identification information has been established as recognition of the divergence form element including the line portions corresponding to the black segments (*d*1) and (*d*2) of column (*k*–2).

Subsequent trains of "1" bits are produced on line (*n*) as a result of further scanning of the scan column (*k*–2). Advance pulses are produced in response to termination of each such subsequent train of "1" bits, whereby the distribution circuit SV is advanced through subsequent ones of its stages SC ..... SN. for each such advance, the previously actuated stage is deactuated. The maximum number of such trains of "1" bits which will be received in response to scanning of a given scan column is less than or at most equal to the total number of stages SA .... SN. Thus, an assigned register position exclusively related to each train of "1" bits derived from a given scan column is provided in matrix MS.

The readout of information registered in the matrix of register MS is effected in response to a train of "1" bits which, in each case, precedes the train of "1" bits identified by the identification information stored at the given register position. For example, for the sequence of registration as previously described, the information registered in core AD and identifying the (*d*1) train of column (*k*–2) is read out as follows. Prior to the appearance, one scan column period later, on line (*n*–1) of the (*d*1) train of column (*k*–2) previously presented on line (*n*), there will have appeared on line (*n*–1) a preceding train of "1" bits. With reference to FIG. 1, the preceding train of "1" bits may have resulted from scanning the lower arcuate portion of the character "5" in accordance with the scan column (*k*–3). (In this example, the (*d*1) train from scan column (*k*–2) is the first information " 1" bit train occurring in column (*k*–2). )

Termination of this preceding train of information "1" bits results in a "1–0" transition to which differentiation circuit OD responds for producing an advance pulse to actuate stage LA of interrogation circuit LV. There is thereby produced an interrogate pulse on interrogate line (*aa*) which effects readout of core AD. Readout of core AD produces a readout pulse on readout line ID which is applied to and sets the intermediate output information register SAD. The intermediate output information register SAP thereby produces and maintains an output pulse which is applied through gate OG*d*1 to a first input terminal of AND gate UG*d*1.

Subsequent registration, or reregistration, of the information identifying the (*d*1) segment or the (*d*1) train requires the determination and satisfaction of the spatial connection condition between the line portion corresponding to the subsequently scanned (*d*1) segment of column (*k*–1) and the previously scanned (*d*1) segment of column (*d*–2). The identifying information for the latter is maintained at the input to the AND circuit UG*d*1 by the output register SAD. The system therefore is now prepared to determine the coincidence condition.

Following termination of the preceding train of "1" bit which produced the "1–0" transition for readout of the information registered in core AD and identifying segment (*d*1) of column (*k*–2), there is presented on line (*n*–1) one or more trains of "0" bits and subsequently the (*d*1) train of "1" bits corresponding to the black segment (*d*1) of the scan column (*k*–2). The occurrence of the (*d*1) train of scan column (*k*–2) on line (*n*–1) occurs one scan column period following the previous presentation of the (*d*1) of scan columns (*k*–1) and (*k*–2) correspond to spatially connected line portions of the upper divergence form element portion, as indicated in FIG. 1, there will appear on the line (*n*) a (*dl*) train of "1" bits resulting from scanning of the segment (*d*1) of column (*k*–1) substantially simultaneously with the occurrence of the (*d*1) train corresponding to column (*k*–2) on the line (*n*–1).

Since the line portion of the character "5" comprising the upper portion of the divergence form element under consideration is inclined upwardly and is not exactly horizontal, it will be apparent that the (*dl*) train of column (*k*–1) will be presented on line (*n*) slightly in advance of the presentation of the (*d*1) train of column (*k*–2) on the line (*n*–1). However, a sufficient number of information bit positions is provided in each scan column to assure that at least one "11" bit pair will exist for the (*dl*) trains of columns (*k*–1) and (*k*–2).

As a result, the coincidence conditions of gate G–11 are satisfied. GAge G–11 passes an output pulse to differentiation circuit D–11 which is actuated thereby to produce an output signal for enabling the AND gate UG*d*1 and the other related AND gates. Since register SAD is maintaining the readout information pulse through OR gate OG*d*1 to the first input of AND gate UG*d*1, the enabling pulse from differentiation circuit D–11 satisfies the conduction conditions of AND gate UG*d*1. AND gate UG*d*1 therefore applies a pulse to the intermediate input information register SE*d*1. Input register SE*d*1 produces and maintains a read-in pulse on its associated read-in line (*sd*1). There has now been assigned the second matrix row of register MS for the reregistering of information identifying the upper portion of the divergence form element corresponding to the segment (*d*1) of columns *k*–1, *k*, ....

In response to the "1–0" transition following termination of the (*d*1) train of column (*k*–1) on line (*n*), which, with the (*d*1) train of column (*k*–2) on line (*n*–1), satisfied the coincidence conditions for the AND gate G–11, differentiation circuit DO produces an advance pulse which is applied to the distribution circuit SV. As noted previously, various of the stages of the distribution circuit SV may have been actuated in the interim, in excess of those associated with the matrix columns assigned to the (*d*1) and (*d*2) trains. Thus, for example, the current advance pulse applied to the distribution circuit SV may actuate the final stage SN. Activation of stage SN produces a setting pulse on its setting line (*vn*) which, since concurrent with the read-in pulse maintained by intermediate information register SE*d*1 on the read-in line *sd*1, sets the core N*d*1 corresponding to the read-in line (*sd*1) and setting line (*vn*) to register the identifying information.

Thus, it will be appreciated that the first scanned black segment (*d*1) has now been advanced in registration out of the first row of elements AD.....ND to the second corresponding row of elements A*d*1....N*d*1. For (*dl*) trains produced in response to scanning of successive scan columns, and corresponding to line portions spatially connected to the line portions, to which the black segment of the respectively preceding scan column corresponds, thereby satisfying the spatial connection or coincidence conditions established by the AND gate G–11, the registration of the identifying information for successive (*dl*) trains will be effected in the second matrix row, and in a matrix column assigned for each successive scan column for the duration of scanning of a given character.

Before further readout and reregistration of the information identifying the (*d*1) segments of the successive scan columns *k*–1, *k*, ..., the registered identification information related to the (*d*2) segments of columns (*k*–2) is readout and, providing coincidence conditions with the (*d*2) segment of column (*k*–1) are satisfied, is again registered. The readout of the registered (*d*2) segment identifying information is effected in response to the termination of the (*d*1) train appearing on line (*n*—1). For the sequence of steps under discussion, column (*k*–1) is currently being scanned, and therefore the (*d*1) train on line (*n*—1) corresponds to the (*d*1) segment of column (*k*–2).

The termination of the (*d*1) train of column (*k*—2) on line (*n*—1) presents a "1–0" transition to which differentiation circuit OD responds to produce an advance pulse which is applied to the interrogation circuit LV. Since stage LA was previously actuated, stage LB is now actuated. There results an interrogate pulse on interrogate line (*ab*) which effects readout of the information "1" bit stored in core B*d*2 and identifying the (d2) train of column (*k*–2). The readout of core B*d*2 produces a readout signal on readout line (1*d*2) which actuates register SA*d*2 to produce and maintain on output pulse at its output terminal which is applied to the AND gate UG*d*2.

The (*d*2) pulse train of column (*k*–2) now is produced on the line (*n*—1) one column scan period following its presentation on line (*n*). Since, with reference to FIG. 1, it is apparent that the line portions corresponding to the segments (*d*2) of column (*k*–1), currently being scanned, and the column (*k*–2), previously scanned, are spatially connected, the coincidence conditions of gate G–11 are satisfied. More specifically, a "11" bit pair will exist for the (*d*2) pulse trains of columns (*k*–1) and (*k*–2), whereby gate G–11 produces an output signal to which differentiation circuit D–11 responds for enabling the gate UG*d*2. Thus, register SE*d*2 is actuated to produce and maintain a read-in pulse on its associated read-in line (*sd*2). Upon termination of the (*d*2) train of column (*k*–1) on line (*n*), the "1–0" transition effects actuation of differentiation circuit DO to product an advance pulse at its output which is applied to the distribution circuit SV.

As described above, the (*dl*) train of the scan column (*k*–1) currently being scanned effected actuation of the last stage SN of the distribution circuit SV. Thus, circuit DO will respond to the "1–0" transition resulting from termination of the (*d*2) train to actuate the first stage SA. It is noted that distribution circuit SV is a conventional circulating shaft register, and that actuation of the last stage SN produces an output signal which is fed back in a circulating fashion to the input of the first stage SA to prepare it for subsequent actuation. Actuation of stage SA produces a setting pulse on its corresponding setting line (*va*) which cooperates with the read-in line (*d*2) to set the core element A*d*2 of the first matrix column to reregister the identifying information for the (*d*2) train of column (–1) in the assigned position.

In accordance with the previously described operations relating to the first and second rows of the matrix during subsequent interrogation and reregistration, the information registered in core A*d*2 is subsequently readout and transmitted to the intermediate information register SA*d*2, whereby the latter is actuated and produces an output pulse from its output terminal which is applied to the AND gate UG*d*2 of the same matrix row. Following a determination that the spatial connection conditions for the corresponding line portions of (*d*2) trains of successive scan columns are satisfied, the AND gate OG*d*2 is actuated and transmits a signal through the OR gate OG*d*2 to actuate intermediate register SE*d*2. Thus, the information identifying the form element of a black segment such as (*d*2) will subsequently be reregistered in a column position of the third matrix row assigned to the black segment (*d*2) for each successive scan column.

In summary, information registered in the matrix of register MS and identifying a train of information "1" bits registered in shift register R, and representing a black segment of a given scan column corresponding to a line portion of a character being scanned, is read out of the register MS simultaneously with the occurrence on the output line (*n*–1) of the register R of the last information "1" bit of the corresponding train of information "1" bits corresponding to the spatially connected black segment of the preceding scan column. The intermediate information registers SAD.....SA*k* store the readout information bit temporarily until the comparator system has determined that a spatial connection exists between the black segment identified by the thus temporarily stored information bit and a black segment represented by a train of information "1" bits received during scanning of the next successive scan column. When the spatial connection criterion is satisfied, the information "1" bit temporarily stored in the intermediate information registers is then made available for renewed registration in the same matrix row of the matrix. For this purpose, the bank of intermediate input information registers SED..... SE*k* are provided to receive the information signal which is transmitted thereto following temporary storage in the other bank of intermediate output information registers SAD.....SAand which satisfied the coincidence conditions of the comparator system. The bank of intermediate input information registers SED......SE*k* provide for maintaining the signals thus received so that upon termination of the train of information "1" bits satisfying the coincidence requirements, and the resultant application of an advance pulse to the distribution circuit SV, there will be effected simultaneous application of the read-in pulse and a setting pulse from the distribution circuit SV for setting a register core element having a column position within the matrix assigned to the particular location of the black segment, to which the train of information "1" bits pertains, within the scan column.

In summary, each train of "1" bits representing a black segment of a scan column corresponding to a line portion of a character being scanned is received in register Rand maintained therein for exactly one scan column period. Information identifying each such train of "1" bits also is registered in an assigned position in register MS. Distribution circuit SV assigns the registration column such that it corresponds to the position of the black segment within a given scan column, and thus the position of the train of "1" bits within the train of information bits as received and registered in register R for a given scan column. Further, the particular row of the matrix of register MS in which the identification information bit is registered is selected in accordance with a previous identification of the form element defined by the line portion to which the back segment, represented by a given train of "1" bits, corresponds. Readout of the registered information identifying the line portion corresponding to a given black segment from the matrix of register R is effected in a preliminary step in response to the train of "1" bits one line ($n$−1) next preceding the train of "1" bits received thereon and representing the given black segment. The identifying information is temporarily stored prior to reregistration. Reregistration occurs only upon the further determination of the existence of a spatial connection between the line portions to which the black segments of a given and a successive scan column correspond. The determination is effected in accordance with a coincidence condition established by a gate which is enabled only in response to the occurrence of an "11" bit pair in the train of "1" bits representing the black segments of a currently scanned and the preceding scanned columns. Once the coincidence condition or spatial connection condition is satisfied, the read-in pulse for effecting reregistration is again maintained through temporary storage. Reregistration of the identifying information bit is subsequently effected in the same matrix row in which the prior registration was effected but in a matrix column newly assigned to the black segment of the currently scanned scan column.

Reregistration of an identifying information bit therefore is effected only in response to read out of a previously registered information bit and the satisfying of the coincidence or spatial connection condition. The initial registration of an information bit is effected in response to identification of the form element. Thus, once the form element has been recognized and identified, reregistration is always effected in the same matrix row selected in accordance with the form element identification. Therefore, the registration of identifying information for a train of "1" bits representing the black segments ($d$1) of the upper portion of the divergence form element for successive scan columns would not normally be registered, since identification of the form element does not occur until subsequent detector of the lower portion ($d$2) of the divergence form element. However, in accordance with the invention, registration of the information identifying the black segment ($d$1) corresponding to the upper divergence portion is effected through the provision of first and second matrix rows relating to that upper divergence portion. The initial registration is effected in the first matrix row simultaneously with the registration of identifying information in the matrix row assigned to the lower divergence portion. In each case, however, the simultaneous registration is effected in matrix columns respectively associated with the relative positions of the upper and lower divergence portions, and thus of the corresponding black segments in the given scan column, so that the circuit operations proceed at all times in the proper sequence.

Special identification of other line portions may also be provided in a similar manner. In addition, it may result that certain form elements may contain a number of portions which must be recognized prior to the identification of the form element and, as a result, the initial registration of the one or more line portions scanned prior to identification cannot be effected. For each such condition, one or more auxiliary matrix rows may be provided for effecting the registration of identification information relating to each of such prior scanned but not registered line portions, in accordance with the foregoing system and operation of the invention. Where such additional auxiliary register capacity is required, suitable transposition of the setting lines from the distribution circuit SV by one or more matrix columns for the specially assigned matrix rows, relatively to the remaining matrix rows, may then be effected, in accordance with the transposition of the setting lines for the first matrix row in FIG. 3.

Any suitable form of register elements may be employed in the matrix of register MS. In the alternative to the magnetic core elements indicated in FIG. 3, the register elements may comprise bistable switches or flip-flops. In such an embodiment, first and second AND gates are associated with each flip-flop. The first AND gate has a first input terminal connected to the setting line associated with the column of the flip-flop and a second input connected to the read-in line ($s$D....$sk$ of the matrix row of the flip-flop. The output of the first AND gate is connected to the trigger input of the flip-flop, whereby upon the simultaneous occurrence of the setting pulse and a read-in pulse at the input terminals of the first AND gate, the latter produces a trigger pulse which sets the flip-flop to its energized state.

The second AND gate associated with the flip-flop has a first terminal connected to the output terminal of the flip-flop at which an output indication is produced when the latter is energized. A second input of the second AND gate is connected to the interrogate line associated with the matrix column of the flip-flop. The flip-flop, when energized, maintains the first input to the second AND gate; upon the subsequent occurrence of an interrogate pulse applied to the second input of the second AND gate, the latter produces an output signal indicating read out of the information bit stored in the flip-flop. Suitable reset means for the flip-flop may be provided; for example, reset may be effected in response to occurrence of the readout signal.

There is further provided for each matrix row an OR gate having a plurality of input terminals. Each input terminal is connected to the output terminal of the second AND gate of a given one of the plurality of flip-flop register elements of the given row. The OR gate thereby provides a decoupling circuit for joining the output lines of each flip-flop of a given matrix row and to combine these outputs to a common output line such as one of the readout lines ID....$lk$.

Various other alternative forms of register elements will also be apparent to those skilled in the art. In accordance with any such embodiment of the matrix register elements of the register MS, there would further be provided the input and output intermediate information registers as shown in FIG. 3. As previously described, the distribution and interrogate circuits SV and LV each include a number of shifting stages which are connected in a ring configuration. Each such stage may also comprise a bistable flip-flop circuit.

FIGURE 4

As discussed previously, it is desirable that suitable registration be made identifying line portions which terminate prior to the back boundary of a character being scanned. For example, in the character "5" of FIG. 1, the arcuate portion extends farthest to the right, and for the direction of successive scan columns indicated, defines the back boundary of the character "5." The upper, generally horizontal line defining the upper portion of the divergence form element therefore terminates prior to or prematurely of the back boundary of the character "5."It is desirable to register identifying information for the generally horizontal line portion so that upon completion of scanning the character "5" to its back boundary, the identifying information related to the generally horizontal line portion is available for subsequent analysis is effecting the character recognition and identification.

For this purpose, an auxiliary row of register elements is provided for registration of information identifying the prematurely terminated line portion. Registration in an assigned register of the auxiliary row is effected in accordance with a signal identifying the termination of the line portion being scanned. From the foregoing discussion of the circuits of FIGS. 2 and 3, it will be recalled that reregistration of previously registered identifying information in the register MS requires that there exists a spatial connection of the line portions corresponding thereto. In the absence of a spatial connection, the identifying information is not maintained beyond one column scan period. Where the line portion has terminated, however, this spatial connection is not satisfied since a train of information "1" bits is not produced in the scan column which extends beyond the terminated line portion. Thus, additional means must be provided for maintaining the registration of the identification information beyond the scan period of a single scanning column. This function further requires that the system recognize the termination, such that the identification information for the last column in which a black segment corresponding to the terminated line portion appears is maintained. In the following discussion, the term "last black segment" will be employed to define the last black segment appearing in a scan column and corresponding to a prematurely terminated line portion.

The circuit of FIG. 4 shows a modification of the circuits of FIGS. 2 and 3 for achieving this extended registration effect for terminated line portions. The elements of FIG. 4 which are identical to the elements of FIGS. 2 and are indicated by identical reference labels. In accordance with FIG. 4, the output line (*n*–1) of the shift register R is connected additionally to an input terminal and an AND gate UG*r* which is enabled for cyclically recirculating or reintroducing into register R the train of information "1" bits previously registered in the shift register R representing and resulting from the scanning of the last black segment corresponding to a prematurely terminated line portion. The manner in which the AND gate UG*r* is thus controlled is described hereafter. The output of AND gate UR*r* is applied through an OR gate OG*r* to the input line (*n*)and from the latter to the shift register R.

The control of the AND gate UG*r* for operation in the manner described is provided by the following circuit modifications, as indicated in FIG. 4. The register MS is provided with an auxiliary row of register elements, A*e*, B*e*, . . . N*e*, respectively associated with the columns of the matrix of register MS. The auxiliary register row includes a corresponding read-in line (*se*) and a corresponding readout line (*le*). Intermediate read-in and readout information registers SE*e* and SA*e* are associated with the read-in and readout lines (*se*) and (*le*), respectively.

The auxiliary row of register element A*e*, . . . N*e* provides for the registration of information identifying the terminated line portion. When such termination information registered in one of the auxiliary register elements is subsequently read out, the output intermediate register SA*e* is actuated to apply and maintain an enabling signal through the gate GE to the second input terminal of the AND gate UG*r* connected to the input line (*n*) of the register R. Upon the registration in register R of a train of information "1" bits recognized to represent the last black segment corresponding to a terminated line portion, there is simultaneously registered in an assigned one of the auxiliary matrix row of register elements A*e*, . . . N*e* termination information identifying the terminated line portion; upon subsequent read out of the termination information, the intermediate register SA*e* supplies an enabling signal to the AND gate UG*r*, enabling its conduction. The enabling of conduction of AND gate UG*r* is initiated simultaneously with the appearance on the output line (*n*–1) of register R of the train of information "1" bits corresponding to the terminated line portion. Thus, the train of information "1" bits is recycled through the AnD gate UG*r* and the OR gate OG*r* to the input line (*n*) for reregistration in the register R. The reregistration of the train of "1" bits will be appreciated to be in proper time sequence with trains of information bits being produced on the line (*n*) from the current scan of a successive scan column.

As described previously, the output from intermediate register SA*e* is applied to one terminal of AND gate G5. The other input terminal of AND gate G5 is connected to an output terminal of OR gate PG, the input terminals of which are connected to respectively associated ones of the intermediate output information registers SA*d*1, . . . SA*d*. AND gate G5 is enabled only upon the simultaneous occurrence of a signal at each of its input terminals and thus only upon the simultaneous occurrence of an output signal from the intermediate register SA*e* of the auxiliary row and from one of the registers SA*d*1, . . . SA*k* of the other register rows.

The assignment of the register position for registration of information identifying a terminated line portion is clear from the foregoing discussion. The matrix row in which the information is registered is always the auxiliary row of elements A*e*, . . . N*e*. The matrix column is assigned by the distribution circuit SV (FIG. 2 and 3) in accordance with the position of the train of "1" bits representing the last black segment in the scan column in which it appears; similarly, subsequent assignment of matrix columns is effected in accordance with the position of the recirculated train of "1" bits representing the last black segment in each successive train of information bits.

Due to the recirculation, the train of information bits representing a last black segment appears on both the input and output lines (*n*) and (*n*–1) of register R. Further, identifying information was previously registered in an assigned register position of the matrix as the line portion was traced prior to its termination. As a result, the identifying information for the terminated line portion is continued to be registered in a matrix row in which it was initially registered, at a position assigned in the normal manner by distribution circuit SV (FIGS. 2 and 3). AS a result, concurrently with readout from the auxiliary row, readout of the initial registration row will be effected, and concurrent reregistration in each such row for a terminated line portion will be effected for the duration of scanning the character containing the terminated line portion. Thus, an output from one of the intermediate output information register SAD, . . . SA*e* will be produced simultaneously with the output from the intermediate output information register SA*e* of the auxiliary row. For any line previously traced, whereby a prior registration of identifying information in register MS was effected, there will therefore be produced an input signal to OR gate PG, which in turn applies a second input to AND gate G5, concurrently with the first input thereto from register SA*e*. Gate G5 is thereby enabled to produce an output signal which is applied to AND gate UG*r* as described above.

The registration of termination information in one of the register elements of the auxiliary register row requires activation of the input intermediate register SE*e*. Activation of the latter requires the presence of a signal at its input terminal, which input terminal is connected to the output terminal of gate G4. Gate G4 produces an output signal only upon the "1–0" transition following a train of information "1" bits for which in the corresponding portion of the train of information bits of the next succeeding scan column there exists only a train of "0" bits. The recognition of the existence of the train of "0" bits during a portion of a currently scanned column which corresponds to a portion of a preceding scan column for which a train of "1" bits was received is effected through the provision of an auxiliary shift register *v*R.

The trains of information bits derived from scanning each scan column of the scan raster for recognition of a given character are, in accordance with FIG. 4, applied through an input line (*n*–1) to the input of the auxiliary register *v*R. The input of the trains of information bits may be derived from the scanning system directly or from subsequent stages connected to the scanning system which provide for smoothing and shaping of the pulses representing the information bits, as mentioned previously. The auxiliary register *v*R may be substantially identical to the register R and comprises a shift register having a number of stages identical to the number of stages of register R, and thus to the number of information bits for a single scan column.

As discussed previously, the registration of an identification information corresponding to a terminated line portion in the auxiliary matrix row requires an output signal from the gate G4 which is applied to the input intermediate register SE*e*. Prior to an explanation of the logic circuits which control the generation of such an output from the gate G4, it is helpful to consider the conditions under which such registration should be effected. AS a first condition, it is necessary that the output signal be generated only upon the determination that the train of information "1" bits corresponding to a scanned black segment represents, in fact, the last such black segment of the scanned line portion prior to its termination; i.e., that the subsequent scanned column will not include a black segment corresponding to that line portion. As a second condition, it is necessary to recognize whether the identification information of the last black segment of the terminated line portion is to be registered for a first time in the auxiliary matrix row or whether the registration is to be a reregistration in the auxiliary row of previously registered termination identification information registered therein. As a third condition, it is important to recognize the existence of a discontinuity in the line portion being scanned, where such discontinuity results from a brief, inadvertent interruption of the line portion, and to continue tracing of the interrupted line portions as a single line. Finally, it is necessary to recognize the occurrence of scanning the back boundary of the character to avoid further reregistration of the identification information of a prematurely terminated line portion, i.e., since scanning of the character is at that time completed, further reregistration is not necessary.

These conditions are satisfied by the circuit of FIG. 4 in the following manner. The gate G4 is a blocking gate having first and second blocking inputs indicated by the input lines connected to dark circular terminals of the gate G4. The gate G4 also comprises an AND gate having two input lines connected to straight line terminals of the gate G4 and associated respectively with AND gate G3 and OR gate MG. The gate G4 therefore produces an output signal only upon the simultaneous occurrence of input signals at each of the AND gate terminals thereof and only in the absence of a blocking signal at either of the blocking terminals thereof.

The development of an enabling pulse at the AND gate terminal of gate G4 associated with OR gate MG will first be examined. The upper terminal of OR gate MG is connected to the output terminal of a "1" bit register *v*SO1. The "1" bit register *v*SO1 includes a lower input terminal to which a pulse is applied from the output of blocking gate *v*GO1 for registering an information bit therein. The "1" bit register *v*SO1 further includes a second upper input terminal to which a pulse is applied from OR gate *v*G10 for resetting or clearing the register *v*SO1.

The lower input terminal of blocking gate *v*GO1 comprises the signal input thereto, and is connected to the output terminal of a differentiation circuit D*n*, the input terminal of which is connected to the line (*n*) at the input of register R. The circuit D*n* produces an output signal in response to a "0–1" transition at its input, and thus in response to the initiation of a train of "1" bits on the line (*n*). The blocking gate *v*GO1 further includes a blocking input indicated by a circular terminal which is connected to the line (*n*+1) at the input to register *v*R. The presence of a "0" bit at the blocking gate terminal leaves gate *v*GO1 enabled to pass signals presented at its signal input; conversely, the presence of a "1" bit at the blocking terminal disables gate *v*GO1 so that the latter cannot pass any input signals.

The blocking gate *v*GO1 satisfies the condition that registration of identification information for a terminated line portion is effected only under the condition that a train of information "1" bits currently received by register R represents the last black segment corresponding to a terminated line portion. As noted previously, the register *v*R is substantially identical to the register R. Register *v*R therefore effects a one column scan period delay of information bits presented on its input line (*n*+1) prior to the output of the same information bits on the line (*n*) at the input to register R. If a train of information "1" bits on line (*n*), in fact, is the last such train, then no corresponding train is presented during the train of information bits presented on line (*n*+1) during the current scan of a scan column, i.e., only information "0" bits are presented on line (*n*+1) in time correspondence to the presentation of information "1" bits on the line (*n*).

The blocking gate *v*GO1 therefore is enabled when a train of "0" bits appears on line (*n*+1) and transmits the signal, produced by differentiation circuit E*n* in response to the train of "1" bits on line (*n*), to the register *v*SO1 to set the latter. Conversely, if a corresponding train of information "1" bits appears on line (*n*+1) during the occurrence of the corresponding train of "1" bits from the previous scan column on the line (*n*), there therefore appears a "1" information bit on line (*n*+1). The "1" bits on line (*n*+1) are applied to the blocking terminal of blocking gate *v*GO1 to disable the latter and prevent the production of an output signal therefrom.

The OR gate MG is provided due to the following additional connection which may be employed. A direction connection from the differentiation circuit D*n* to the OR gate MG may be provided, whereby an enabling signal at the first input And terminal of gate G4 is applied in more rapid manner than that provided by the "1" bit information register *v*SO1. There is further provided a connection from the line (*n*+1) to the lower blocking terminal of gate G4. If a "1" information bit appears on line (*n*+1) simultaneously with the "0–1" transition output signal applied directly from differentiation circuit D*n* and through OR gate MG to the AND gate terminal of gate G4, the latter will be disabled and prevented from passing an output signal, even if there concurrently is produced an input signal at the second AND gate terminal.

In accordance with further conditions to be described, the "1" bit register *v*SO1 must maintain its output signal, when once set, until subsequent enabling of the gate G4. This requires that the output signal must be maintained for the duration of the train of information "1" bits on line (*n*) corresponding to the terminated line portion. Reset of the register *v*SO1 must therefore be accomplished upon termination of the train of "1" bits under discussion.

Reset of register *v*SO1 is effected by OR gate *v*G10 and the differentiation circuit DO. The circuit DO is connected at its input to the line (*n*) and is effective to produce an output pulse in response to recognition of a "1–0" transition of the train of information "1" bits on line (*n*). the output pulse is coupled through OR gate *v*G10 to the reset terminal of "1" bit register *v*SO1 to reset the latter. There is further provided a connection to an input terminal of OR gate *v*G10 from the line (*n*+1). Any "1" bit information pulse occurring on line (*n*+1) is coupled through OR gate *v*G10 to the reset terminal of "1" bit register *v*SO1. It will be appreciated that no such "1" bit appears on line (*n*+1) if the line portion in question has terminated. However, the train of "1" bits on line (*n*+l) may be slightly delayed in time, relative to the corresponding train of "1" bits on line (*n*), due to a nonhorizontal, upwardly inclined line portion of a character being scanned. As a result, although register *v*SO1 might have been previously set, it will be reset shortly thereafter by a blocking signal corresponding to the first "1" bit of the corresponding train appearing on the line (*n*+1).

As mentioned earlier, gate G4 requires the simultaneous occurrence of enabling inputs at each of the AND gate terminals thereof for producing an output signal. The enabling pulse at the second AND gate terminal is not effected until the end of the train of information "1" bits relating to the terminated line portion, as explained below. Thus, a prior setting and resetting of the "1" bit register *v*SO1 is established at the termination of the train of "1" bits in question. Similarly, the enabling output pulse produced by differentiation circuit D*n* and applied directly through OR gate MG to gate G4 will not enable gate G4 unless this enabling output pulse occurs at the appropriate time.

The second enabling pulse for gate G4 is produced by AND gate G3. A first terminal of AND gate G3 is connected to the line ($n$). For gate G3 to be enabled there must exist a "1" bit on the line ($n$) of the train of "1" bits in question. The second input terminal of AND gate G3 s connected to the output of OR gate G2. OR gate G2 has two input terminals connected respectively to a NEITHER/NOR-gate, G1, and a blocking gate, G6.

NEITHER/NOR-gate G1 produces an output pulse only in the absence of an input pulse at either of its input terminals, each of which input terminals is shown as an enclosed circle representing a blocking input terminal. The first input terminal of gate G1 is connected to the next to last register stage of auxiliary register νR. The existence of a "1" bit in the next to last stage thereof blocks NEITHER/NOR-gate G1 and prevents the presence of an output pulse at its output terminal. Conversely, when a "0" bit is registered in the next to last stage of auxiliary register νR, no input is applied to the first blocking terminal of NEITHER/NOR-gate G1 nd thus the first coincidence condition for establishing of an output pulse at its output terminal is satisfied. The first occurrence of the "0" bit at the next to last stage of auxiliary register νR provides an indication that the last information "1" bit of the train of information "1" bits under consideration has now been presented on line ( $n$) at the input to register R.

The second coincidence condition for production of an output from NEITHER/NOR-gaxe G1 is that the train of "1" bits under consideration is being registered for the first time in register R. If this condition is met there will be no output enabling signal from the AND gate G5 to the input of AND gate UG$r$, and thus the second coincidence condition is satisfied. Conversely, if the train of "1" bits has been previously registered in register R and is now being recirculated for a subsequent registration therein, there will be present an enabling signal such as a "1" bit signal on the line connected to the input of AND gate UG$r$, which will be applied to the second blocking terminal of NEITHER/NOR-gate G1, preventing the production of an output signal therefrom.

The blocking gate G6 produces an output signal only for the condition that the train of "1" bits under consideration has been registered in register R at least once and is now being recirculated for reregistration therein; further, it produces an output pulse only in time coincidence with the presence of the last "1" bit of the train of "1" bits under consideration on the output line ($n$—1) of register R. These conditions are satisifed as follows.

A signal terminal of blocking gate G6 is connected to the line connecting the output of And gate G5 to the input of AND gate UG$r$. A signal is maintained on this line throughout the period of enabling of gate UG$r$ for the reregistration of the recirculated train of "1" bits being produced on the output line ($n$-1) of the register R. Thus during this period of recirculation in register R, a signal is maintained at the signal input of blocking gate G6, satisfying a first condition for the production of an output pulse therefrom. Blocking gate G6 also includes a blocking or disabling input, indicated by an enclosed circular terminal, which is connected to the next to last stage of the register R. As discussed in accordance with the auxiliary register νR and gate G1, gate G6 will be blocked and not produce an output pulse until a "0" bit is stored in the next to last stage of shaft register R and thus not until the last "1" bit of the train of "1" bits under consideration has been presented on the line ($n$—1). Since AND gate UG$r$ is enabled at this time, the last "1" bit on line ($n$—0) is also applied through AND gate UG$r$ to the input line ($n$) of the register R.

In summary, AND gate G3 will be enabled to produce an output pulse for enabling gate G4 only under the condition that there exists on the line ($n$) at the input t the register R an information "1" bit of the train under consideration, which "1" bit must be the last bit of the train either as it is transmitted to the register R from the auxiliary registers νR for an initial or first registration therein, or as it is transmitted through the return loop including ANd gate UG$r$to the line ($n$) for a recirculation registration in register R.

Thus, if in the course of scanning of a line portion of a given character, it is ascertained for the first time that a line portion for which in previous scan columns there existed a black segment relating thereto, does not continue in the currently scanned column, then upon the appearance of the last information "1" bit of the train thereof relating to the last black segment corresponding to the terminated line portion, the coincidence conditions for gates G1, G3 and G4 will be satisfied. Thus, an output signal from gate G4 will be transmitted to intermediate input register SE$e$ to set the latter, Register SE$e$will thereby produce and maintain a read-in signal on the associated read-in line ($se$) of the auxiliary matrix row provided for registration of information identifying terminated line portions. Subsequent registration in the auxiliary register row will be effected at the register element of the matrix column assigned by distribution circuit SV to the black segment of the terminated line portion.

In accordance with the description of the readout of information from the matrix of register ME in respect to FIG. 3, it will be appreciated that the information identifying the terminated line portion and registered in the auxiliary matrix row of FIG. 4 will be read out shortly before the appearance on line ($n$—1) of the train of information "1" bits registered in register R and which represents the last scanned black segment of the terminated line portion under consideration. The readout information is stored in the intermediate output register SA$e$, the latter thereby maintaining an input signal to the gate G5. The information initially stored in another of the matrix rows, but in the same assigned matrix column for each scan column is read out simultaneously, whereby one of the registers SA$d$1, . . . SA$k$ maintains a second input through OR gate PG to AND gate G5.

Gate G5 is thereby actuated and produces an output signal enabling AND gate UG$r$ for recirculating the train of information "1" bits under consideration therethrough and through the OR gate OG$r$ and to line ($n$) for reregistration in the register R. If, during the duration of the reregistration of this train of information "1" bits into register R., no information "1" bits of a corresponding train thereof appear on line ($n$+1) at the input to auxiliary register νR, and upon the appearance of the last "1" bit on line ($n$) of the train under consideration, the coincidence conditions for gate G6, G3, G4 are satisfied. Thus, gate G4 produces an output signal upon termination of the train of "1" bits under consideration for actuating the intermediate input information register SE$e$. Register Se$e$ maintains a read-in signal on read-in line ($se$) for registering identifying information in the auxiliary row in accordance with the assignment of a register position by the distribution circuit SV (FIGS. 2 and 3).

Should "1" bits appear on line ($n$+1) during the appearance of the subject train of "1" bits on line ($n$), indicating that the line portion has in fact not terminated, the coincidence conditions for gates G 6 and G3 will be satisfied. However, the "1" bit register νSO1 will be reset to its holding position response to the first such simultaneously appearing "1" bit on line ($n$+1); thus, the coincidence condition for enabling of gate G4 is no longer satisfied. A renewed registration of the information identifying the last scanned black segment of a terminated line portion in the auxiliary register row therefor is not effected. As a further result, AD gate G5 and UG$r$ are no longer actuated, whereby the recirculation of the train of "1" bits is also terminated.

As a result of this last described function, and as indicated previously, the system of the invention may ascertain the inadvertent interruption of a line portion and operate to recognize the parts of the line portion separated by the interruption as a continuous line portion. Thus, short and faulty interruptions of line portions do not result in misregistration or inaccurate line tracing which could result in inaccurate character recognition.

Upon reaching the back boundary of the character being scanned, there is produced a blocking signal applied to a second blocking input terminal of gate G4 which prevents further registration in the auxiliary row of the register MS of the information identifying a terminated line portion. The cessation of reregistration is desirable since line tracing i completed upon reaching the back boundary.

The system of the invention permits tracing the individual lines or line portions of a scanned character to effect a highly accurate analysis of the character structure. Further, the invention provides for the advantageous effect of tracing the course of line portions which have formed a previously identified form element or which in a subsequent portion of the course thereof will form such a form element. As a particular example of the operation of the system with regard to form element recognition, there may be ascertained the appearance initially of divergence and later the appearance of convergence of line portions defining a form element. The successive divergence and convergence of line portions which are traced and determined to be continuous is recognized to define an enclosed form element.

The recognition of an enclosed form element may proceed as follows. In accordance with the foregoing description of operation, information is stored in appropriately assigned register positions of the register MS in accordance with the recognition of a divergence form element and identifying, for each scanning column, first and second trains of "1" bits corresponding to the upper and lower form element portions. Simultaneously, there may be ascertained the convergence of the line portions comprising the upper and lower form element portions and thus the subsequent appearance of a convergence form element.

With respect to FIG. 3, and in accordance with the foregoing description thereof, the matrix rows within which the information identifying the upper and lower form element portions of a divergence form element comprise the rows associated with the intermediate output information registers SA*d*1 and SA*d*2 and the respectively associated readout lines 1*d*1 and 1*d*2. The intermediate output information registers SA*d*1 and SA*d*2 produce outputs representing the previously registered, readout information from these rows of the matrix of register MS which represent recognition and tracing of the upper and lower form element portions. The registers SA*d*1 and SA*d*2 include output terminals D1 and D2, respectively, at which output information bits are produced representing the readout registered identification information from the associated matrix rows.

There is provided a "1" bit register S*d*1 having a signal input connected to the terminal D1 and a reset input connected to the terminal D2. There is further provided a gate GVUF having three input terminals requiring simultaneous application thereto of input signals for producing an output signal at the terminal VUF. A first input terminal is connected to the output of register S*d*1. A second input terminal is connected to the terminal D2 and a third input terminal is connected to an information input line (*k*2).

A signal produced at terminal D1, indicating recognition of an upper divergence form element portion, is applied to the "1" bit register S*d*1, which thereupon registers this information bit and maintains it at the first input to gate GVUF. A signal produced at terminal D2, indicating recognition of the lower divergence form element portion of the same divergence form element, is applied to the second input to gate GVUF. As discussed previously, recognition of form elements is well known and is not described herein. However, if a convergence form element is recognized, an appropriate information signal is applied to the line (*k*2). If the convergence information signal on line (*k*2) occurs simultaneously with the signal from register SA*d*2 and from S*d*1, all coincidence conditions required for enabling of gate GVUF are satisfied. There results an output signal at the output terminal VUF which indicates the recognition of a completely enclosed form element. As indicated, the signal at terminal D2 may also be employed to reset register S*d*1. Thus, the upper and lower form element portions must be continuous, and continuously traced, simultaneously with the recognition of both divergence and convergence form elements defined thereby, to further effect the recognition of an enclosed form element.

It is also noted that the last matrix row of register MS includes an input line (*k*1). Thus, in the manner described with respect to the upper and lower divergence form elements to which the black segments (*d*1) and (*d*2) of successive scan columns *k*–2, . . . *k* . . . correspond, there may be applied to the input line (*k*1), a signal representing the identification of a convergence form element related to form element portions presented by line portions of the character being scanned. In fact, the lower portion of the character "5" comprises such a convergence form element.

It will be appreciated that other such formed elements may be appropriately ascertained and identified to provide for tracing of the form element portions thereof in the system of the invention. Other types of recognizable form elements, for example, include convergent form elements, enclosed or completely surrounded form elements, and vertical and horizontal lines or other angularly oriented straight lines.

From the foregoing description of the recognition of an enclosed form element from the tracing of upper and lower form element portions of a divergence form element, and the subsequent recognition of the convergence of the form element portions, it will be appreciated that the line tracing performed by the invention may also be employed to recognize the interconnection of other form elements and to provide a further description of the line portions of such form elements and their interconnection and relationships.

The component circuits required for the construction of the circuits of the invention as set forth in the foregoing figures and description may be of any of various types which are well known to those skilled in the art. Examples of the component circuits such as the various gates, bistable flip-flop stages, shifting registers, and the like, all as mentioned above, are discussed and shown in "Development Reports of Siemens & Halske AG," 22nd annual publication, second series, pages 159–171, Aug. 1959.

Figure 5A:
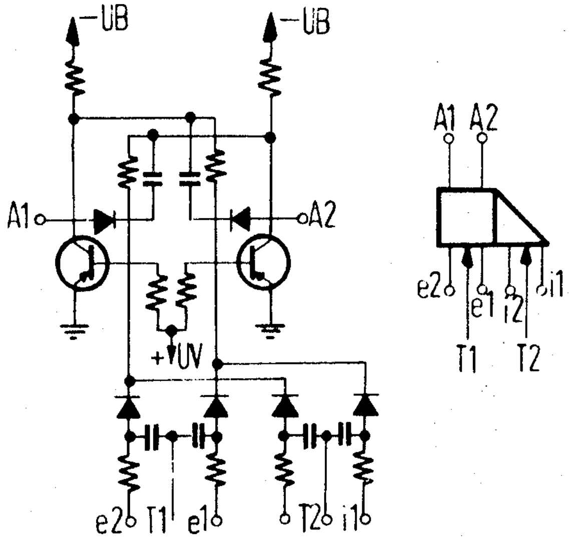
Figure 5B:
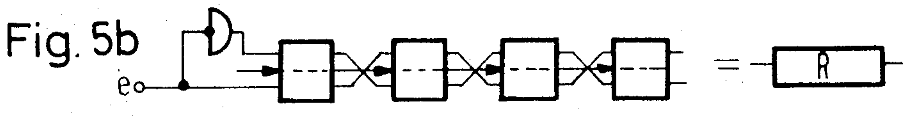

There are shown in FIGS. 5*a* to 5*f* various conventional circuit schematics and block diagrams of circuit systems suitable for use in the system of the invention. More specifically, FIG. 5*a* shows a conventional bistable flip-flop circuit in both a schematic and and in a conventional block diagram form. The flip-flop circuits of FIG. 5*a* are suitable for employment as the stages of the shift registers or as a register element of the matrix of register MS, in accordance with the alternative embodiment thereof discussed above. FIG. 5*b* shows a block diagram of a shift register having bistable flip-flop stages in accordance with the requirements of the shift register R and the auxiliary register *v*R.

Figure 5C:
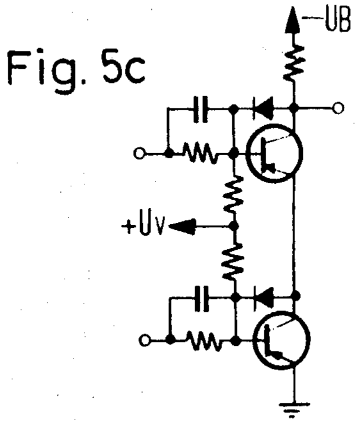
Figure 5D:
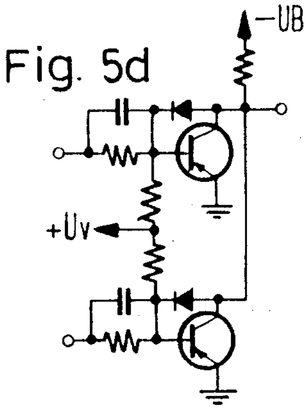

FIGS. 5*c* and 5*d* show two basic logic circuits which, with appropriate biasing levels, and for input and an output signals of predetermined polarities, may provide the required functions of the gates of the system of the invention. Briefly, the circuit of FIG. 5*c* includes two PNP transistors connected in series through a load resistor to a power supply terminal –UB. An output terminal is provided at the junction of the load resistor and the collector terminal of the upper PNP transistor. By contrast, in FIG. 5*d*, two PNP transistors are connected in parallel with their emitter terminals connected to ground and their collector terminals connected in common through a load resistor to a power supply terminal –UB. An output terminal is provided at the junction of the collector terminals and the load resistor. In the circuit of FIG. 5*c*, a positive output is obtained at the output terminal if both transistors are conducting, and a negative output if either transistor is not conducting. Conversely, if FIG. 5*d*, a positive output is obtained if either one of the transistors is conducting and a negative output if both of the transistors are not conducting. Thus, by defining the polarities of the input signals and the polarity of the signal at the output terminal, and by adjusting bias conditions for establishing the transistors in each of the circuits of FIGS. 5*c* and 5*d* in either an initially conducting or an initially nonconducting state, these circuits may be operated variously to provide the functions of an AND gate or an OR gate or a NEITHER/NOR-gate.

Figure 5E:
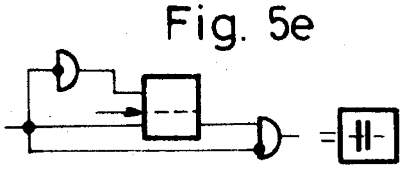
Figure 5F:
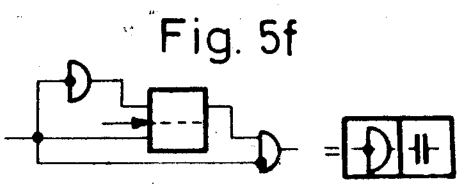

FIGS. 5e and 5f show differentiation circuits which emit an output signal in response to "0–1" and "1–0" signal transitions, respectively, in accordance with the requirements of the differentiation circuits OD and D11 and the circuit D0 of FIG. 3, respectively, and the differentiation circuit DN and circuit DO of FIG. 4, respectively.

The character recognition system of the invention operates in an efficient and highly accurate manner to trace the line portions of a character being scanned. The tracing permits for recognizing inadvertent interruptions or breaks in the line portions, such that upon the occurrence of such an interruption the tracing of the line portions is continued for the part following the interruption and the interruption is ignored. The tracing of each line portion of a character is effected in accordance with the registration of identifying information specifically related to each such line portion being traced. Further, a line portion which terminates prematurely, or prior to the back boundary of a character being scanned, is recognized; a special registration of the identifying information relating to the terminated line portion is produced and maintained until completion of scanning to the back boundary of the character.

The line scanning is effected in accordance with recognition of predetermined basic form elements wherein one such form element or a composite of more than one such form elements serves to assist in identifying the character being scanned. Where such a form element comprises divergent, or separated portions, or where such separated portions are scanned and thereafter recognized to comprise a convergent form element, suitable registration of each such portion is effected. Further, as shown with respect to form element portions comprising initially a divergent form element, and subsequently a convergent form element, the tracing of the lines defining form element portions, in accordance with the system of the invention, provides for recognizing the interconnection of form elements. In the example given, the tracing of form element portions initially recognized to comprise a divergence form element and subsequently recognized to converge and comprise a convergence form element results in an identification of an enclosed form element. It is apparent that other such form elements and their interconnections will also be recognized through the line tracing functions of the system of the invention.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

1. In a character recognition apparatus a recognition system wherein a character to be recognized is scanned in a raster of successive columns, scanning of each column producing a column train of scan signals and each column defining at least a black segment corresponding to a line portion of the character scanned in the column and represented by a train of black segment scan signals, the combination comprising:

- a first register (R) for receiving scan signals (over line $n$) and having a capacity for registering the scan signals of a column train thereof,
- a second register (MS) having a number of register positions (A...N) assignable to each train of black segment scan signals registered in the first register (R),
- distribution means (SV) for assigning a register position of said second register (MS) to each train of black segment scan signals registered in said first register and for transmitting information characterizing the line portion corresponding to each such train of black segment scan signals to the register position assigned thereto,
- interrogation means (LV) for selectively reading out the identifying information from each such assigned register position of said second register,
- comparator means (G11) for comparing black segment scan signals of a scan column registered in said first register with the black segment scan signals of a succeeding scan column for recognizing a spatial connection of the respectively corresponding line portions in the latter two scan columns and
- gate means (UG) connecting an output of said interrogation means with an input of said distribution means and operable in response to recognition by said comparator circuit of a spatial connection between the line portions corresponding to black segment scan signals of a scan column and its succeeding scan column to transmit the identifying information read out by the interrogation circuit from the register position assigned to the black segment scan signals of the scan column for registration in a register position assigned to the black segment scan signals of the succeeding scan column.

2. A system as recited in claim 1 further comprising:

- decoupling means (OG; OG$d$2...OG$k$) having first and second input terminals and an output terminal, said output terminal being connected to the input of said distribution means (SV) and a first input terminal being connected to the output of said gate means (UG), and
- input means ($dk$; $d$2...$k$) connected to the second input of said decoupling means (OG; OG$d$2...OG$k$) for applying identifying information thereto.

3. A system as recited in claim 2 2 wherein said input means ($dk$; $d$2...$k$) is connectable to an output of a system for recognizing character form elements, whereby the identifying information comprises identification of a character form element defined by a scanned line portion.

4. A system as recited in claim 1 wherein:

- said first register (R) comprises a shift register having a number of stages equal to the number of scanning signals in a column train of scanning signals and including an input line ($n$) and an output line ($n$–1), and
- said input line ($n$) applying received scan signals of a succeeding scan column to the input of said first register (R) and said first register (R) applying the scan signals registered therein of a preceding scan column to the output line ($n$–1) one column scan period following receipt thereof at the associated input line ($n$).

5. A system as recited in claim 3 further comprising:

- means (G4, G5 and respectively associated systems) for determining the premature termination of a traced line of a scanned character, and producing a premature termination signal in response to recognition thereof,
- recirculating means (UG$r$, OG$r$) having a first input connected to said means (G5) for recognizing premature termination of a traced line and a second input connected to the output line ($n$–1) of said first register (R) and an output connected to the input line ($n$) of said first register (R), said recirculating means (UG$r$, OG$r$) being operative in response to a premature termination indication to recirculate the last train of black segment scan signals corresponding to the terminated line portion scanned in the scan column preceding termination thereof into the column train of scan signals for the column succeeding termination of the terminated line portion for a reregistration thereof in the first register (R).

6. A system as recited in claim 1 wherein:

- said second register (MS) includes a plurality of register positions connected in a matrix of columns (A$d$....N$d$1) and rows (A$d$1....A$k$), said register positions defined by said plurality of columns (A$d$1....N$d$1) being individually assignable to each train of black segment scan signals registered in said first register (R) and to a predetermined form element corresponding to each of said plurality of rows (A$d$1....A$k$).

7. A system as recited in claim 6 wherein there is further provided:

a plurality of intermediate output information registers (SA*d*1....SA*k*) rows for temporarily registering identifying information read out from the respectively associated row, a plurality of intermediate input information registers (SE*d*1....SE*k*) rows for temporarily registering identifying information for subsequent registration in an assigned register position of the associated matrix row, and gate means (UG*d*1....UG*k*) connecting respectively associated ones of the output and input intermediate information registers (SA*d*1....SA*k*, SE*d*1....SE*k*) and enabled in response to determination by said comparator means (G11) of spatial connection of the line portion corresponding to a train of black segment scan signals of a succeeding scan column and the line portion of the preceding scan column identifying information stored in the associated output intermediate information registers (SA*d*1....SA*k*) thus temporarily stored to the associated input intermediate information register (A*d*1....A*k*) for temporary storage therein to effect reregistration of the identifying information in the associated matrix row in accordance with the column position assigned by the distribution means (SV).

8. A system as recited in claim 7 wherein there is further provided:

a plurality of decoupling means (OG*d*2....OG*k*) each having a first input connected to a respectively associated one of the gate means (UG*d*1...UG*k*) and an output terminal connected to said input intermediate information registers (SE*d*1....SE*k*) for transmitting the previously registered identifying information thereto and a second input connected to an information input line (*d*2*b*....*k*1) for receiving form element identifying information to effect row assignment for registration of identifying information upon initial recognition of the form element defined by a line portion corresponding to a train of black segment scan signals of a given scan column.

9. A system as recited in claim 8 wherein:

said matrix further includes a first auxiliary row of register positions (AD....ND) including input and output intermediate information registers (SED, SAD), and there is further provided a decoupling circuit (OG*d*1) having first and second inputs connected to the output of said output intermediate information register (SAD) of said auxiliary row and to the output of an output intermediate information register (SA*d*1) of an associated matrix row and having an output connected to the input intermediate information register (SE*d*1) of said associated matrix row, said input intermediate information register (SED) of said auxiliary row being connected to an information input line (*d*2*a*) common to the input line (*d*2*b*) of a second matrix row, said register positions (AD....ND) of said auxiliary row being transposed by one register position relative to the columns (A*d*1....N*d*1) register position of said matrix for assignment of a register position and for registering identifying information in the assigned register position simultaneously with the assignment of and registration in an assigned register position of said second matrix row of the same identifying information, whereby said assigned register position of said auxiliary row precedes by one column the assigned register position of said second matrix row, and said decoupling circuit (OG*d*1) advances the identifying information register in said auxiliary row (AD....ND) to said associated matrix row (A*d*1...N*d*1) for reregistration thereof in a register position assigned to the black segment train of a succeeding scan column representing a line portion spatially connected to the line portion identified by the identifying information initially registered in said auxiliary matrix row.

10. A system as recited in claim 9 wherein:

said matrix further includes a second auxiliary matrix row Ae....N*e*) having register positions respectively corresponding to said matrix columns and assignable for registration of information identifying prematurely terminated, traced lines, and there is further provided:

a recirculation gate (UG*r*) connecting said output line (*n*−1) of said first register (R) to said input line (*n*) thereof, and means (G4, G5 and associated apparatus) for identifying a traced prematurely terminated line and operative to compare scan signals of successive scan columns to determine premature termination of a traced line portion in accordance with the presence of a black segment train corresponding thereto in a scan column preceding the line termination and the absence of a black segment train corresponding thereto in a scan column succeeding the line termination for enabling the said recirculation gate (UG*r*) to recirculate black segment train representing the terminated line portion of the preceding scan column from said output line (*n*−1) of said first register (R) to said input line (*n*) thereof for reregistration in said first register (R) in the related position of each succeeding column train of scan signals and for assigning a register position in said second auxiliary register row (A*e*....N*e*) to register information identifying the prematurely terminated line portion for each succeeding scan column.

11. A system as recited in claim 6 wherein:

each of said distribution and interrogation means (SV...LV) comprises a shift register having a number of register stages at least as large as the number of trains of black segment scan signals derivable from a single column scan, each register stage being associated with each of said matrix columns (A*d*1...N*d*1), said first register (R) comprises a shift register having a number of stages equal to the number of scan signals in a column train of scan signals, said first register (R) further having an input line (*n*) for receiving scanning signals and an output line (*n*1) to which said first register (R) advances scan signals previously registered therein one column scan after receipt thereof on said input line (*n*), said distribution means (SV) is connected to said input line (*n*) for actuating each stage thereof in sequence in response to successive trains of black segment scan signals on said input line (*n*) for assigning a column of register positions, each such black segment train for registration of information identifying the line portion corresponding thereto, and said interrogation means (LV) is connected to said output line (*n*−1) of said first register (R) for interrogating each column of register positions of said matrix in sequence in response to each such black segment train on said output line (*n*−1) substantially one column scan following registration therein.

12. A system as recited in claim 11 wherein each scan column includes a predetermined number of information bit positions and each column train of scan signals comprises a column train of information bits including a train of "1" bits representing each black segment and a train of "0" bits representing remaining portions of a scan column, and wherein there are further provided, first and second differentiation means (DO, OD) connecting said distribution and interrogation (SV, LV) to said input and output lines (*n*, *n*−1) respectively, of said first register (R) to produce an advance pulse in response to a "1–0 transition at the termination of each train of "1" bits for actuating each stage of said interrogation and distribution means (SV, LV) in sequence to perform the assigning and interrogating functions thereof, respectively.

13. A system as recited in claim 12 wherein:

said comparator circuit determines spatial connection of line portions corresponding to black segments of a succeeding and a preceding scan column in accordance with the presence of an "11" bit pair in their respective trains of information bits.

14. A system as recited in claim 13 wherein said comparator circuit comprises an AND gate.

15. A system as recited in claim 11 wherein:

said matrix further includes a second auxiliary matrix row (Ae....Ne having register positions respectively corresponding to said matrix columns and assignable for registration of information identifying prematurely terminated, traced lines, and there is further provided:

a recirculation gate (UGr) connecting said output line (n–1) of said first register (R) to said input line (n) thereof, and means (Gr, G5 and associated apparatus) for identifying a traced prematurely terminated line, and operative to compare information bits of successive scan columns to determine premature termination of a traced line portion in accordance with the presence of a train of information "1" bits corresponding thereto in a scan column preceding the line termination and the presence of a train of information "0" bits in the related portion of a column train of information bits derived from the scan column succeeding the line termination for enabling the said recirculation gate (UGr) to recirculate the train of information "1" bits representing the terminated line portion of the preceding scan column from said output line (n–1) of said first register (R) to said input line (n) thereof for reregistration in said first register (R) in the related position of each succeeding column train of information bits and for assigning a register position in said second auxiliary register row (Ae....Ne) to register information identifying the prematurely terminated line portion for each succeeding scan column.

16. A process for recognizing by machine at least the form elements constituting a character utilizing line tracing techniques wherein a character to be recognized is scanned in a raster of successive scan columns, a black segment being defined in each scan column where the scan column intersects a line portion of the scanned character, comprising the steps of:

recognizing line portions and generating black segment signals responsive thereto, registering in a first register means the black segment signals occurring in a given scan column in accordance with their positions in that scan column, simultaneously with said registration in said first register of a given black segment signal in the column being scanned, registering in a second register means information identifying the corresponding line portion in a position of said second register means assigned to said given black segment signal, determining in said machine for each said black segment signal registered in said first register means whether a spatial connection exists with black segment signals in the next succeeding scan column, simultaneously with the registration of a black segment of a succeeding scan column corresponding to a spatially connected line portion, registering in said second register means in a position therein assigned to said black segment signal of said succeeding scan column the identifying information previously registered for said given black segment signal in the preceding scan column, driving the positions of said second register means in a cyclic succession, the driving means being advanced from position to position by each black segment signal, the driving signal for said register positions being a signal corresponding to the identifying information for the line portion currently being analyzed, interrogating said register positions in said second register means in cyclic succession, the interrogating means being advanced from segment to segment responsive to black segment signals from the preceding scan column stored in said first register means and communicating the results of the interrogation to the positions of said second register being driven upon determination of the existence of a spatial connection.

17. A method as recited in claim 16 further comprising the steps of:

recognizing a form element defined by a scanned line portion for establishing the identifying information, and assigning the register position in said second register for registering the identifying information in accordance with the recognized form element.

18. A method as recited in claim 16 further comprising the steps of:

reading out the identifying information registered in each such assigned second register position prior to one column scan period following the registration thereof for clearing the register position, temporarily storing the readout identifying information, simultaneously with the registration of a black segment of a succeeding scan column corresponding to a line portion spatially connected to the line portion identified by the temporarily stored identifying information and corresponding to the black segment of the next preceding scan column, registering the identifying information in a second register position assigned to the black segment of the succeeding scan column.

19. A method as recited in claim 18 further comprising the step of:

terminating the temporary storage of readout identifying information during a succeeding immediately adjacent scan column having no black segment corresponding to a line portion spatially connected to the line portion identified by the temporarily stored identifying information.

20. A method as recited in claim 16 further comprising the steps of:

registering in sequence, component black segments of each successive scan column corresponding respectively to component line portions defining a form element, recognizing, in a given scan column, the form element thus defined, substantially simultaneously with the registration of the last registered component black segment corresponding to the given form element for the given scan column, simultaneously registering in second register positions assigned respectively to the component black segments, information identifying the corresponding, recognized form element, and substantially simultaneously with the registration, in sequence, of each of the component black segments of each scan column immediately adjacent and succeeding the given scan column, and upon determining spatial connection of the component line portions respectively corresponding to the component black segments of the succeeding and the given preceding scan column, registering, in sequence, in register positions respectively assigned to the component black segments for the succeeding scan column, the identifying information previously registered for the component black segments of a preceding scan column.

21. A method as recited in claim 20 wherein the registered information identifying the component line portions corresponding to the component black segments of each succeeding immediately adjacent scan column comprises information identifying the form element defined thereby.

22. A method as recited in claim 20 further comprising the steps of:

recognizing divergence of the component line portions in the given scan column to identify the form element as a divergence form element substantially simultaneously with the recognition of the component black segment last to be registered in the given scan column in which the component black segments first appear.

23. A method as recited in claim 22 further comprising the step of, in a given succeeding scan column having component black segments corresponding to component line portions spatially connected to component line portions corresponding to black segments of a preceding immediately adjacent scan column and defining a divergence form element, recognizing convergence of the component line portions corresponding to the black segments of the given succeeding scan column for identifying a closed form element defined by the spatially connected component line portions.

24. A method as recited in claim 16 further comprising the steps of:

comparing the black segment of a given position in a preceding scan column with the related position of a succeeding immediately adjacent scan column, and recognizing the presence of a black segment in the said related position of the succeeding scan column and determining spatial connection of the line portions corresponding to the black segments of the preceding and succeeding scan columns for tracing a line having line portions spatially connected through successive adjacent scan columns.

25. A method as recited in claim 24 further comprising the steps of:

recognizing an initial form element defined by a line portion corresponding to a black segment of a given scan column, determining spatial connection of the line portions respectively corresponding to black segments of the given and succeeding scan columns for tracing a line having line portions spatially connected from the given through succeeding scan columns, and recognizing, in a given succeeding scan column, a further form element associated with the line traced through the preceding scan columns and defining the initial form element to identify the relationship of the initial and further form element.

26. A method as recited in claim 24 further comprising the steps of:

recognizing premature termination of a traced line by identifying the corresponding last black segment in the scan column preceding the line termination, and maintaining registration of information identifying the prematurely terminated, traced line in a register position associated with prematurely terminated line portions and assigned to the last black segment for its associated scan column next preceding the termination of the line and for its relative position in each remaining scan column succeeding the line termination.

27. A method as recited in claim 16 further comprising the steps of:

defining a predetermined number of information bit positions in each scan column of the scan raster, scanning each scan column of the scan raster in succession to produce a train of information bits respectively related to the information bit positions of each scan column and including "1" bit trains representing black segments and "0" bit trains representing other segments of the scan column, registering in said first register each information bit of each scan column in the sequence as scanned for the duration of a column scan period, and determining the spatial connection of line portions corresponding to black segments of successive scan columns by recognizing the existence of an "11" bit pair of trains of "1" information bits representing the black segments of the successive scan columns.

28. A method as recited in claim 27 further comprising the step of:

registering information identifying a black segment of a scan column in an assigned second register position upon detection of a "1–0" transition at the termination of the "1" bit train representing the black segment.

29. A method as recited in claim 27 further comprising the steps of:

recognizing premature termination of a traced line by comparing a "1" bit representing an information bit position of a black segment of a scan column corresponding to the traced line prior to the termination thereof and a "0" bit representing the corresponding bit position of the scan column succeeding the termination of the traced line, and registering the train of "1" bits representing the black segment corresponding to the traced line in the scan column preceding the termination thereof beyond the duration of a single column scan period.

30. A method as recited in claim 29 further comprising the step of:

reregistering the train of "1" bits representing the black segment corresponding to the line portion of the scan column preceding termination thereof in the same position of the train of information bits representing each scan column succeeding the line termination.

31. A method as recited in claim 30 further comprising the step of:

registering the information identifying the terminated line and previously registered in a register position assigned to the black segment corresponding thereto in the scan column preceding the line termination in a register position assigned to the reregistered trains of "1" bits in each successive scan column.

32. A method as recited in claim 30 further comprising the steps of:

identifying the back boundary of a character being scanned, and terminating the reregistration of a train of a train of "1" bits corresponding to a terminated line portion upon identification of the black boundary of a character.